US 7,908,485 B2

(12) United States Patent
Hibino et al.

(10) Patent No.: US 7,908,485 B2
(45) Date of Patent: Mar. 15, 2011

(54) PRINTING SYSTEM

(75) Inventors: Masaaki Hibino, Aichi-ken (JP); Yohei Maekawa, Aichi-ken (JP); Koshi Fukazawa, Aichi-ken (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 11/808,686

(22) Filed: Jun. 12, 2007

(65) Prior Publication Data
US 2007/0244963 A1    Oct. 18, 2007

Related U.S. Application Data

(62) Division of application No. 10/290,178, filed on Nov. 8, 2002, now Pat. No. 7,389,414.

(30) Foreign Application Priority Data

| Nov. 9, 2001 | (JP) | ................................. | 2001-344757 |
| Nov. 15, 2001 | (JP) | ................................. | 2001-350286 |
| Dec. 6, 2001 | (JP) | ................................. | 2001-372848 |

(51) Int. Cl.
*G06F 21/00* (2006.01)
*G06F 15/16* (2006.01)
*H04K 1/00* (2006.01)

(52) U.S. Cl. ............ 713/182; 709/228; 705/51; 380/270

(58) Field of Classification Search .................. 713/182; 700/235; 902/6; 709/228; 386/46; 380/270
See application file for complete search history.

(56) References Cited

U.S. PATENT DOCUMENTS

| 5,513,126 | A | * | 4/1996 | Harkins et al. ................ 709/228 |
| 6,151,464 | A | | 11/2000 | Nakamura et al. |
| 6,199,164 | B1 | * | 3/2001 | Nishimoto et al. ............... 726/2 |
| 6,208,428 | B1 | * | 3/2001 | Chihara et al. ............... 358/1.15 |
| 6,584,466 | B1 | * | 6/2003 | Serbinis et al. ............... 715/209 |
| 6,590,673 | B2 | * | 7/2003 | Kadowaki ..................... 358/1.15 |
| 6,609,115 | B1 | * | 8/2003 | Mehring et al. ................ 705/51 |

(Continued)

FOREIGN PATENT DOCUMENTS

EP            0 929 023 A1    7/1999

(Continued)

OTHER PUBLICATIONS

Uno, "The PC Technology," Nikkei WinPC, vol. 6, No. 5, pp. 116-118 (Mar. 1, 2000).

(Continued)

*Primary Examiner* — Techane J Gergiso
(74) *Attorney, Agent, or Firm* — Oliff & Berridge, PLC

(57) ABSTRACT

An imaging system is provided with an authentication data storage that stores a plurality of pieces of authentication data in relationship to user IDs respectively representing owners of the plurality of communication devices. Further included is a reading system that reads out one of the plurality of pieces of the authentication data corresponding to a user ID if the user ID is transmitted from the external device in relationship to the image data, and a searching system searches for a communication device with which a connection authentication is established using the authentication data read out by the reading system within a predetermined communication area with respect to the imaging system. An imaging system forms an image represented by the image data transmitted in relationship to the user ID from the external device when the communication device is detected by the searching system.

5 Claims, 24 Drawing Sheets

U.S. PATENT DOCUMENTS

| | | | |
|---|---|---|---|
| 6,625,335 B1* | 9/2003 | Kanai | 382/306 |
| 6,801,340 B1* | 10/2004 | Endo | 358/403 |
| 6,952,780 B2* | 10/2005 | Olsen et al. | 726/26 |
| 6,959,328 B1* | 10/2005 | Gillaspy et al. | 709/220 |
| 6,980,319 B2* | 12/2005 | Ohta | 358/1.18 |
| 7,099,023 B2* | 8/2006 | Chrisop et al. | 358/1.14 |
| 7,148,981 B2* | 12/2006 | Fujitani | 358/1.15 |
| 7,272,647 B2* | 9/2007 | Haraguchi et al. | 709/224 |
| 7,379,914 B2* | 5/2008 | Aoki et al. | 705/40 |
| 2001/0029531 A1* | 10/2001 | Ohta | 709/223 |
| 2001/0034747 A1* | 10/2001 | Fujitani et al. | 707/525 |
| 2001/0046067 A1* | 11/2001 | Taniguchi | 358/1.15 |
| 2002/0013869 A1* | 1/2002 | Taniguchi et al. | 710/33 |
| 2002/0039479 A1* | 4/2002 | Watanabe et al. | 386/46 |
| 2002/0040308 A1 | 4/2002 | Hasegawa et al. | |
| 2002/0051577 A1* | 5/2002 | Kinjo | 382/218 |
| 2002/0054067 A1 | 5/2002 | Ludtke et al. | |
| 2002/0054345 A1* | 5/2002 | Tomida et al. | 358/1.15 |
| 2002/0056043 A1 | 5/2002 | Glass | |
| 2002/0089589 A1 | 7/2002 | Adair | |
| 2002/0091569 A1* | 7/2002 | Kitaura et al. | 705/14 |
| 2002/0131652 A1 | 9/2002 | Yoda | |
| 2002/0138557 A1* | 9/2002 | Mukaiyama et al. | 709/203 |
| 2002/0147864 A1 | 10/2002 | Katada et al. | |
| 2002/0161830 A1 | 10/2002 | Mukaiyama et al. | |
| 2002/0161831 A1 | 10/2002 | Nakaoka et al. | |
| 2002/0164059 A1 | 11/2002 | DiFilippo et al. | |
| 2002/0166046 A1 | 11/2002 | Bidarahalli et al. | |
| 2002/0174073 A1* | 11/2002 | Nordman et al. | 705/64 |
| 2002/0181006 A1* | 12/2002 | Chrisop et al. | 358/1.14 |
| 2002/0181010 A1* | 12/2002 | Pineau | 358/1.15 |
| 2002/0186408 A1 | 12/2002 | Nakaoka et al. | |
| 2003/0005330 A1* | 1/2003 | Berkema et al. | 713/201 |
| 2003/0027528 A1* | 2/2003 | Hagiwara et al. | 455/66 |
| 2003/0032400 A1* | 2/2003 | Tsubaki et al. | 455/186.1 |
| 2003/0063749 A1* | 4/2003 | Revel et al. | 380/270 |
| 2003/0065766 A1* | 4/2003 | Parry | 709/224 |
| 2003/0086122 A1* | 5/2003 | Parry | 358/402 |
| 2006/0012828 A1 | 1/2006 | Ohta | |

FOREIGN PATENT DOCUMENTS

| | | |
|---|---|---|
| EP | 1 152 592 A1 | 11/2001 |
| GB | 2 342 197 A | 4/2000 |
| JP | A-11-191043 | 7/1999 |
| JP | A-11-249848 | 9/1999 |
| JP | A-2000-177212 | 6/2000 |
| JP | A-2001-5762 | 1/2001 |
| JP | 2001-109678 A | 4/2001 |
| JP | A-2001-105690 | 4/2001 |
| JP | A-2001-154822 | 6/2001 |
| JP | A-2001-186123 | 7/2001 |
| JP | A-2001-217948 | 8/2001 |
| JP | A-2001-219627 | 8/2001 |
| JP | A-2001-236183 | 8/2001 |
| JP | A 2001-256010 | 9/2001 |
| JP | A 2001-312388 | 11/2001 |
| JP | A-2001-312388 | 11/2001 |
| JP | A 2001-325182 | 11/2001 |
| JP | A-2001-325182 | 11/2001 |
| JP | A-2002-55911 | 2/2002 |
| JP | A-2002-304269 | 10/2002 |
| JP | A-2002-318676 | 10/2002 |
| JP | A 2003-015998 | 1/2003 |
| JP | A-2004-259289 | 9/2004 |

OTHER PUBLICATIONS

Yashiro et al., "A Proposal of a Vehicle Network Using Intervehicle Transmission Method," 85 *Electronics and Communications in Japan* 40-50 (2002).

* cited by examiner

FIG. 1A

PRINTER
NAME [_____] PROPERTY
STATUS  READY

RANGE
○ ALL
○ PAGES   FROM [___]  TO [___]

☐ CONFIDENTIAL   USER ID [_____]

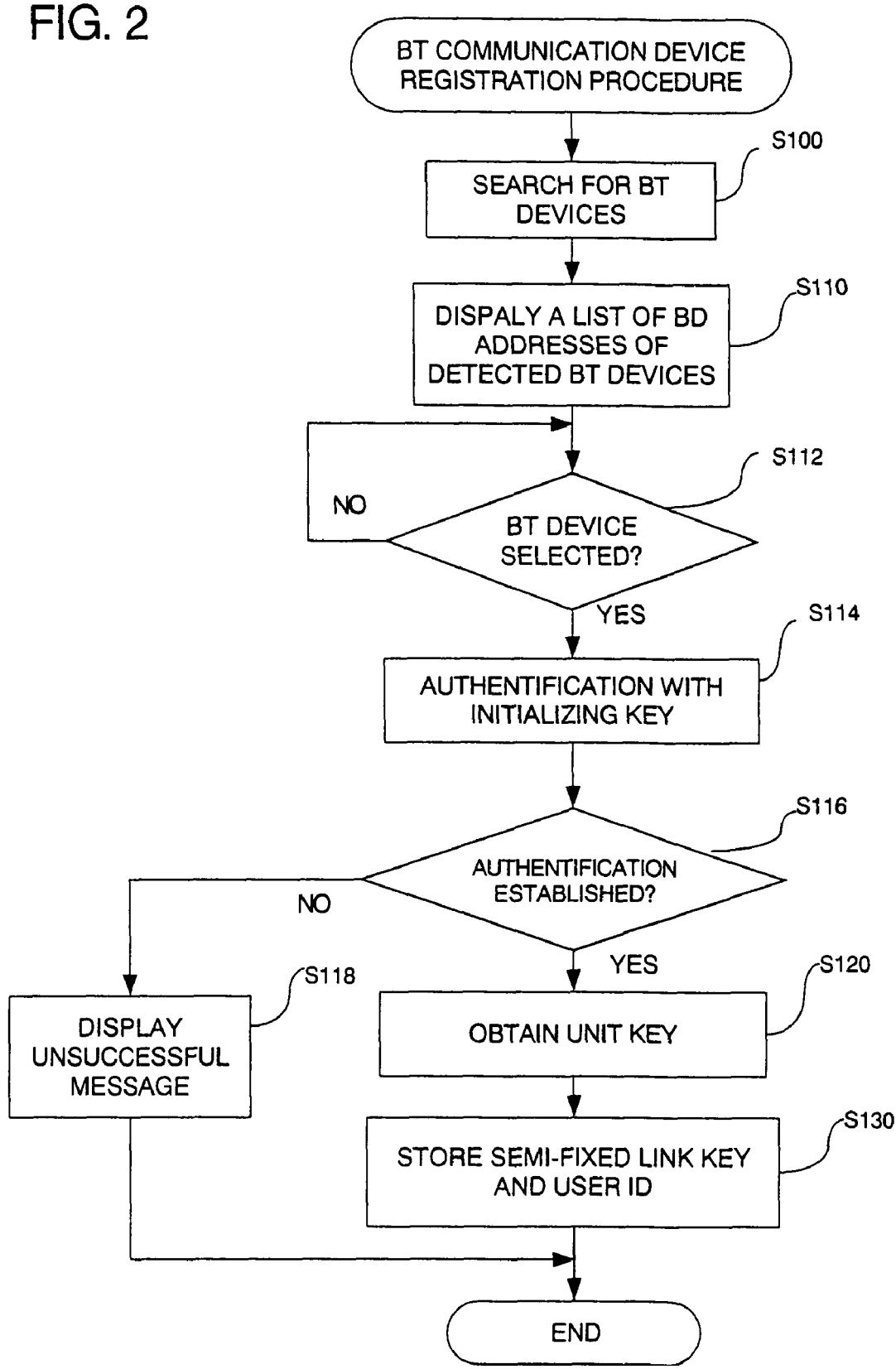

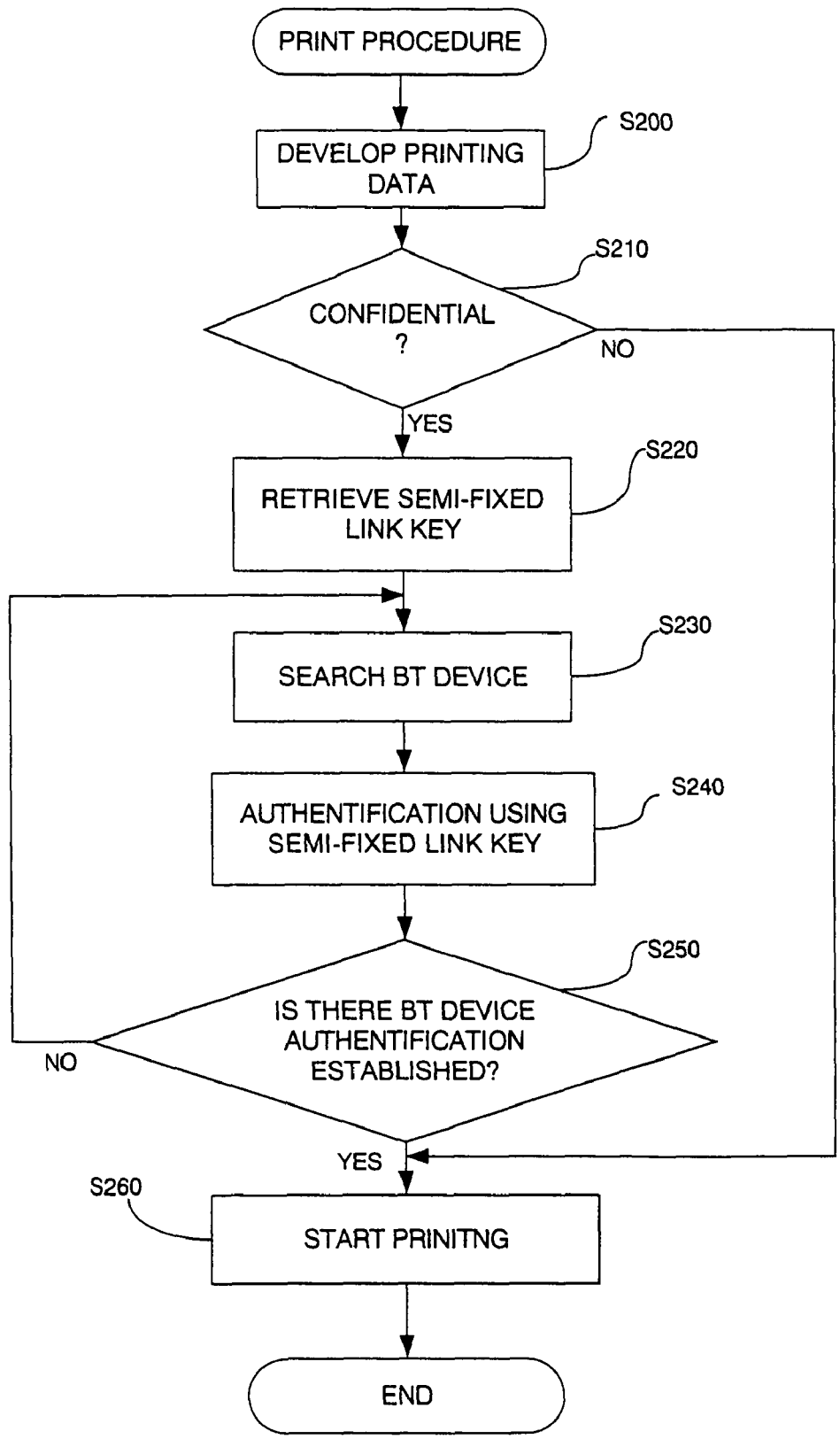

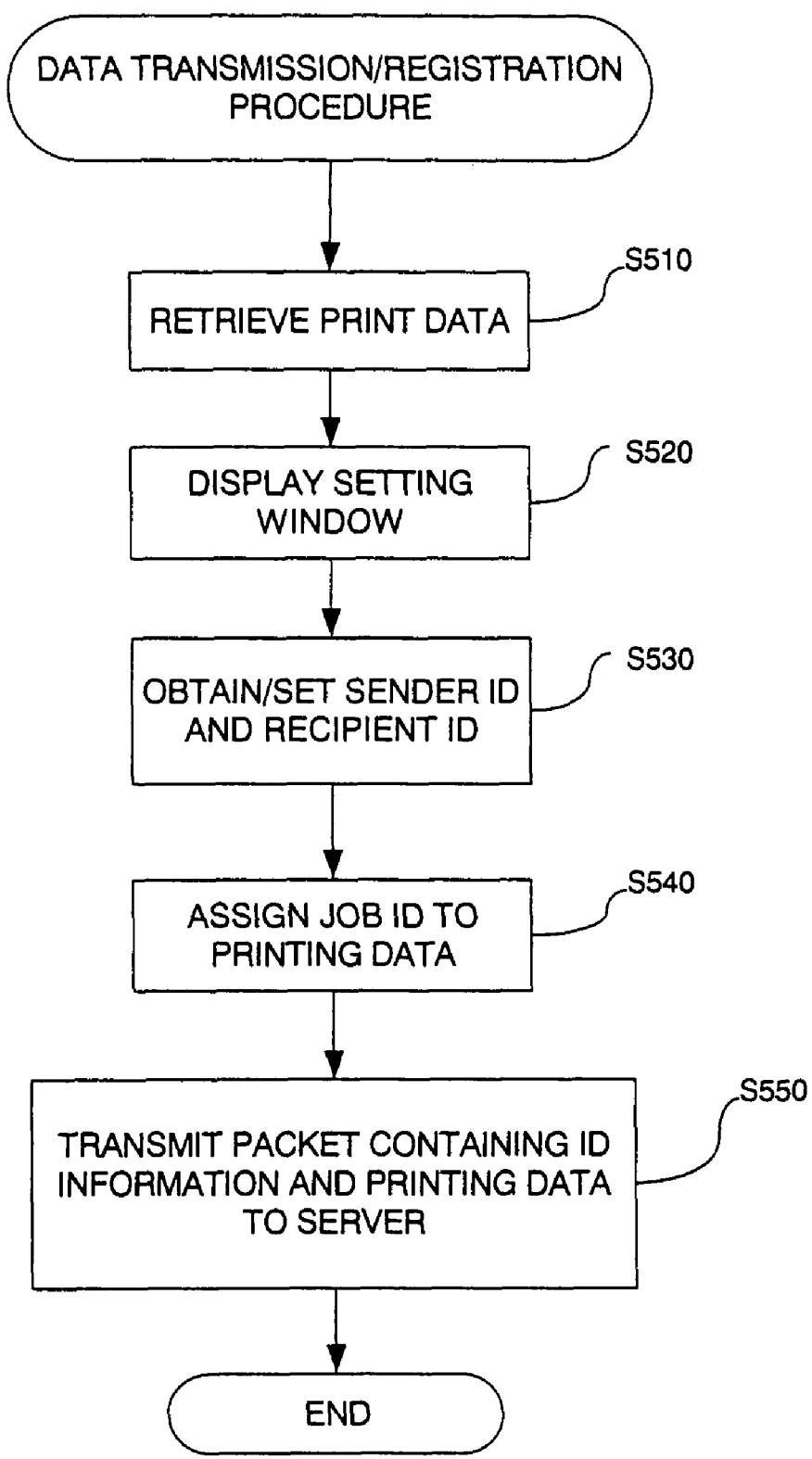

| PRINTER NAME | IP ADDRESS | BD ADDRESS | DEFAULT |
|---|---|---|---|
| A | 12.123.34.XX | 43:55:67:24:56:XX | |
| B | 12.123.22.XX | 1F:2D:33:4E:52:XX | |
| C | 22.34.123.XX | 22:56:17:FE:AB:XX | |
| D | 10.143.32.XX | FE:AE:34:22:12:XX | |

| RECIPIENT NAME | E-MAIL ADDRESS | BD ADDRESS | PHONE NUMBER |
|---|---|---|---|
| KEN | ken@xxx.co.jp | 12:55:22:24:FE:xx | 090-xxxx-xxxx |
| Taro | taro@xxx.co.jp | 12:FD:33:42:5E:xx | 090-xxxx-xxxx |
| Hanako | | 22:56:37:FE:AB:xx | 090-xxxx-xxxx |
| Word | word@xxx.com | AC:A0:31:22:13:xx | 090-xxxx-xxxx |

| COMMUNICATION METHOD | PRIORITY |
|---|---|
| BLUETOOTH | 1 |
| E-MAIL | 2 |
| TELEPHONE CALL | 3 | ns
PRINTING SYSTEM

This is a Division of application Ser. No. 10/290,178 filed on Nov. 8, 2002. The disclosure of the prior application is herby incorporated by reference herein in its entirety.

BACKGROUND OF THE INVENTION

The present invention relates to a printing system including a printer and a plurality of terminal devices, which are interconnected through a network system.

Conventionally, a printing system including an image forming device such as a printer, and at least one external device interconnected through a network system has been known. Typically, the image forming device is located remote from the external device. In such a system, it may happen that a confidential document is to be printed, i.e., printing data of the confidential document may be transmitted to the image forming device through the network so that the confidential document is printed by the image forming device. In such a case, if the image forming device prints out the confidential document as soon as it receives the printing data through the network, there is a possibility that the printed out document may be viewed by a person who is not an intended recipient of the document.

To solve the above problem, the assignee has suggested, in Japanese Patent Provisional Publication P2001-217948, a printing system including a personal computer (hereinafter referred to as a PC) and a printer interconnected through a network. In this system, printing data and a password are transmitted to the printer, which are stored in a storage of the printer. Thereafter, when the password is transmitted from a cell phone to the printer, the printer starts printing of the stored printing data corresponding to the password.

According to the above configuration, even through the printer is remote from the PC and the printing data is transmitted to the printer, the printer does not starts printing until it receives the password corresponding to the printing data. Therefore, a confidential documents will not be printed out and therefore viewed by an unintended recipient.

However, according to the above system, it is necessary to certify the recipient, and for this purpose, it typically requires a password to be input through the cell phone, which is troublesome.

Another system is disclosed in Japanese Patent Provisional Application P2000-177212. According to this system, a printer receives printing data and an ID number of an intended recipient of the printout, and stores the same. The recipient always brings an ID card with him/her. The ID card has a signal transmitting/receiving function. The printer is configured to transmits an ID requiring signal to ID cards within a predetermined communication area. When a holder of the ID card comes inside the predetermined communication area, the ID card receives the ID requiring signal. Then, the ID card transmits the ID number to the printer in response to the ID requiring signal. Upon receipt of the ID umber from the ID card, the printer checks whether it currently stores printing data corresponding to the received ID number, and if any, starts printing the data.

According to the above configuration, it becomes possible that a print job of the printing data is initiated when the recipient of the printing data is sufficiently close to the printer. Further, it is unnecessary for the recipient to manually input the password in response to the request from the printer.

According to this system, however, a recipient is required to always bring the dedicated ID card with him/her. It may be inconvenient since a dedicated ID card should be designed for the printing system. Further, every user of the printing system must bring the ID card only for the purpose of initiating a print job.

There is also known a printing system, which includes a plurality of PCs and a plurality of image forming devices such as a printer interconnected with each other through a network system.

In such a system, when a print job is executed, a user may designate an image forming device to be used using the PC. For example, when a user intends to print printing data using a printer, firstly, he/she controls the PC to display a list of printers available on the network system, and select one of them to be used. Then, the user starts a printing job, and the printing data is transmitted to the selected (designated) printer.

In the conventional system, however, a printer is selected based on the names of the imaging devices, IP addresses and the like. Therefore, it is necessary that the user should know a relationship between each image forming device as listed and location thereof in order to obtain a printout from an image forming device at a desired location.

In order to solve this problem, according to a network printer system disclosed in Japanese Patent Provisional Publication P2001-154822, operator ID for identifying an operator is used to designate a printer to be used.

Specifically, according to the system in this publication, the printer obtains an operator ID from a user in a setting mode, and broadcast the obtained operator ID together with the ID data (e.g., MAC address or the like) within the network. A work station (or PC) obtains, in a setting mode, the operator ID, and compares the operator ID included in the broadcast signal and operational ID with the broadcast data. If the input operator ID and the broadcast ID coincide with each other, the printer from which the operator ID is broadcast is selected as the printer to be used.

According to the system as above, without a troublesome setting operation, an appropriate printer can be selected and control the same to executed a print job.

However, according to the above-described system, if the user desires to switch a plurality of image forming devices, setting operations should be performed when the printers are switched, which is troublesome.

Further, when a plurality of users use the same printer in a shared manner, the confidentiality of the printout as aforementioned arises again. That is, when a user selects one imaging device, and control the same to print out a confidential document, if the image forming device outputs the document upon receipt of the printing data, the output may be viewed by an unintended recipient.

Still further, in a system including a plurality of image forming devices and a plurality of terminals interconnected with each other, it sometimes happens that a user requiring a print job (i.e., a demander) and a recipient of the output of the print job are different. If the demander and the recipient are the same, the demander selects, for example, a printer which is close to the demander. However, if they are different, it is necessary for the demander to know a location of the recipient. It is especially important when the recipient does not stay at the same position.

According to the JP provisional publication P2001-154822, which is mentioned before, the demander designates a printer to be used. Specifically, the printer requires the demander to input an information key, which is broadcast in the network together with the identification data (e.g., MAC address) thereof. A workstation requires the demander to input the information key, and compares the input information key with the broadcast information key. If the information keys are judged to be the same, the printer which broadcast the information key as the target printer, to which the print data is transmitted.

Thus, by modifying the system such that the demander inputs the information key through a PC and the recipient inputs the information key through a printer, it becomes possible to configure a system in which the printer closed to the recipient is controlled to executed the print job directed to the recipient.

According to such a system, however, it is necessary for the recipient to input the information key through the printer, which is relatively troublesome. Further, the information key input by the recipient must be identical to that input by the demander through the PC. Therefore, if the demander and the recipient are different, the information key should be notified from the demander to the recipient, which may not get along in a practical use.

SUMMARY OF THE INVENTION

The present invention is advantageous in that the above-described deficiencies of conventional network systems can be resolved. That is, according to the present invention, improved network printing system is provided in which a confidential document is printed only when a recipient is close to a printer which outputs the confidential document without requiring a troublesome procedure such as inputting of passwords by the recipient. Alternatively or optionally, according to the invention, when a plurality of image forming devices are connected with a network system, an appropriate one is selected without requiring troublesome input operations by the user. Alternatively, in a printing system including a plurality of image forming devices, a print job is performed by a printer which is located close to a recipient of the output of the print job without requiring troublesome input operations by the recipient.

According to an aspect of the invention, there is provided an imaging system that forms an image represented by image data transmitted from an external device on a recording sheet. The imaging system is provided with an authentication data storage that stores a plurality of pieces of authentication data to be used for performing connection authentication with each of a plurality of communication devices, on a link layer, the plurality of pieces of authentication data being stored in relationship to user IDs respectively representing owners of the plurality of communication devices. Further included is a reading system that reads out one of the plurality of pieces of the authentication data from the authentication data storage corresponding to a user ID if the user ID is transmitted from the external device. It should be noted that the user ID is related to the image data. The imaging system further includes a searching system that searches for a communication device with which a connection authentication is established using the one of the plurality of pieces of the authentication data read out by the reading system within a predetermined communication area with respect to the imaging system. The imaging system further includes an image forming system that forms an image represented by the image data transmitted in relationship to the user ID from the external device when the communication device with which the connection authentication is established is detected by the searching system.

According to the above configuration, the following advantages are achieved.

(1) It becomes unnecessary to input a password or the like for authentication of the user before the image formation is started.

(2) It is possible to use a general use communication device since when a communication device starts communicating with another device, the connection authentication is performed using the authentication information intrinsic to respective communication devices. For example, in the publication P2000-177212, the ID card communicating with the printer is required to store the ID number of the use of the ID card, and to function to transmitting the ID number in response to the request signal from the printer.

(3) If the image forming device is configured such that the image formation is executed immediately when the communication device with which the connection authentication is established is detected, when the user goes to the image forming device, the image formation is automatically started.

Optionally, the imaging system described above may include a requesting system that requests a user of the communication device, with which the connection authentication is established, for a reply indicating allowance of starting the image formation with the image forming system via the communication device, and a reply receiving system that receives the reply from the communication device. In this case, the image forming system starts forming the image corresponding to the communication device when the reply receiving system receives the reply from the communication device.

With this configuration, since it is confirmed whether the image formation is to be started or not, unintentional starting of the image formation can be prevented.

Further optionally, the imaging system may include a judging system that judges whether a predetermined command is transmitted from the external device in relationship to the image data, the predetermined command indicating that an authentication is required when the image data is printed, and a controller that inhibits operation of the reading system, the searching system and the image forming system when the predetermined command is not transmitted in relationship to the image data, the controller controlling the image forming system to immediately start forming an image represented by the image data on the recording sheet if the predetermined command is not transmitted in relationship to the image data.

In a certain case, the imaging system may be configured to communicate with the communication devices in accordance with the Bluetooth communication method, and one of a unit key and a combination key may be used as the authentication data.

Still optionally, the imaging system may be configured to communicate with the communication devices in accordance with the Bluetooth communication method, and a BD address may be used as the authentication data.

According to another aspect of the invention, there is provided a data management system capable of communicating with a plurality of imaging devices through a network, the data management system managing image data stored in a database, the image data stored in the database being processed by the plurality of imaging devices. The data management system may include a data registration system that receives, from an external device connected to the network, image data and recipient information representing a recipient who receives the image represented by the image data, the data registration system registering the image data with the database in relationship to the recipient information, a plurality of user ID obtaining systems that obtains a plurality of user IDs from a plurality of wireless external devices assigned with the user IDs via wireless communication, and a data transmitting system that determines a target image forming device to be used for forming an image represented by the image data based on the IDs obtained by the plurality of user ID obtaining systems and the recipient information of the image data, the data transmitting system transmitting the image data to the target imaging device.

With this configuration, if the user has a wireless communication device assigned with the user ID, based on the detection results of the user ID, a location of the user can be judged, and based on this judgment, the imaging device to be used can be selected within the network. Accordingly, the user need not select the imaging device, and the appropriate imaging device is automatically selected, and the image data is processed thereby.

An exemplary method of having the data transmitting system to determined the imaging device to which the image data is transmitted, using the network addresses assigned to respective devices in the network may be convenient.

A plurality of communication devices, each including a wireless communication device and a user ID obtaining system, for obtaining the user ID are arranged within the network. Each communication device is configured to transmit the network address assigned thereto as well as the user ID to the data transmitting system. Further, the data transmitting system is configured to judge the location of the communicating devices, from which the user ID is obtained, based on the network address thereof, thereby the image forming device to which the image data is transmitted is determined. With such a configuration, for example, in a network including a plurality of sub networks, an image forming device within the same sub network where the communication device from which the user ID is obtained is connected can be used for printing the image.

Optionally, the user ID obtaining systems may be provided in the plurality of imaging devices, respectively, and the data transmitting system may determine the target imaging device as the imaging device having the user ID obtaining system that has obtained the user ID corresponding to the recipient ID of the image data.

Further, each of the imaging devices may include an image data obtaining system that transmits a request for sending image data to the data transmitting system. In this case, when a request for image formation is input by a user, the image data obtaining system transmits a user ID of a wireless communication device obtained by the user ID obtaining system and a request for transmitting image data which is stored in the database in relationship to the user ID. The image data obtaining system then obtains image data as a reply to the request for transmitting image data. The data transmitting system may retrieve the image data stored in the database in relationship to the user information corresponding to the user ID transmitted, together with the request for image data, from the image data obtaining system through the network, the data transmitting system transmitting the retrieved image data to the image data obtaining system from which the request for the image data was received.

Still optionally, the image data obtaining system is capable of obtaining an image formation request, which was transmitted from the wireless communication device in accordance with a predetermined operation by a user, through the wireless communication system.

According to a further aspect of the invention, there is provided a database server capable of communicating with a plurality of imaging devices through a network, the database server including a database for storing image data, the image data stored in the database being processed by the plurality of imaging devices. The database server may include a data registration system that receives, from an external device connected to the network, image data and recipient information representing a recipient who receives the image represented by the image data, the data registration system registering the image data with the database in relationship to the recipient information, and a data transmitting system that retrieves the image data stored in the database in relationship to the user information corresponding to the user ID transmitted, together with the request for image data, from the image data obtaining system through the network, the data transmitting system transmitting the retrieved image data to the image data obtaining system from which the request for the image data was received.

When the data transmitting system receives the request for sending a list of the image data registered with the database from the imaging device through the network, the data transmitting system transmits a list of image data stored in the database in relationship to the user information corresponding to the user ID which is transmitted together with the request for the list of the image data to the imaging device from which the request for the list was received.

According to another aspect of the invention, there is provided an imaging device connected to a database storing a plurality of pieces of image data in relationship to recipient information indicating recipients to receive images represented by the plurality of pieces of image data, respectively, the imaging device being capable of communicating with the data base. The imaging device is provided with a user ID obtaining system that obtains user IDs of external wireless communication devices assigned with user IDs, respectively, through a built-in wireless communication unit, an image data retrieving system that retrieves image data that is stored in relationship to the user ID which is obtained by the user ID obtaining system from the database, and an image forming system that forms an image represented by the image data retrieved by the image data retrieving system.

When an image formation request is input to the image data retrieving system from a user, the image data retrieving system retrieves the image data which is stored in the database in relationship to the recipient information corresponding to the user ID which is obtained by the user ID obtaining system.

Optionally, the image data retrieving system is capable of obtaining the image formation request, which is transmitted from the external wireless communication device by the operation of the user, through the built-in wireless communication system.

The imaging device may further include a notification system. If the image data is stored, in the database, in relationship to user information corresponding to the user ID obtained by the user ID obtaining system, the notification system transmits notification indicating registration of the image data to the user.

Optionally, the image data retrieving system may be configured such that a list of the image data stored in relationship to the recipient information corresponding to the user ID from the database based on the user ID obtained by the user ID obtaining system, and the notification system may be configured such that the list of the image data obtained by the image data retrieving system is displayed so as to be viewed by the user.

The imaging device may further include a selection information obtaining system that obtains information indicating selection of the user on the list of the image data, the image data retrieving system selectively retrieving the image data selected by the user based on the selection information obtained by the selection information obtaining system when the image formation request is received from the user.

According to a further aspect of the invention, there is provided an user ID obtaining device for a data management system capable of communicating with a plurality of imaging devices through a network. The data management system manages image data stored in a database, and the image data stored in the database is processed by the plurality of imaging devices. Further, the data management system includes a data registration system that receives, from an external device connected to the network, image data and recipient information representing a recipient who receives the image represented by the image data, the data registration system registering the image data with the database in relationship to the recipient information.

The user ID obtaining systems may include a wireless communication device through which the user ID obtaining system obtains a plurality of user IDs from a plurality of wireless external devices assigned with the user IDs, respectively.

The data management system may include a data transmitting system that determines a target imaging device to be used for forming an image represented by the image data based on the IDs obtained by the user ID obtaining system and the recipient information of the image data, the data transmitting system transmitting the image data to the target imaging device.

According to another aspect of the invention, there is provided a data management system including a plurality of imaging devices that form images represented by image data, a data management device that is capable of communicating with the plurality of imaging devices, and a communicating device that is capable of communicating with the data management device and the imaging devices.

The communicating device may include a searching system that searches for the imaging device that can communicate with the communicating device, and an ID information transmitting system which transmits, when the searching system detects an imaging device, first identification information for identifying the image forming device, together with second identification information for identifying the communicating device, to the data management device. Further, the data management device may include a readout system that readouts recipient information incorporated in the image data representing a recipient of the image represented by the image data from the image data to be processed by one of the plurality of image forming devices, an ID information receiving system that receives the first identification information and the second identification information from the ID information transmitting system, and a data transmitting system that transmits the image data from which the recipient information corresponding to the second identification information received by the ID information receiving system to the image forming device which is identified based on the first identification information received by the ID information receiving system.

Optionally, the data transmitting system may transmit the image data to a predetermined imaging device if the readout system does not readout the recipient information form the image data.

When the readout system readouts the recipient information incorporated in the image data, the data management device includes a receipt notification system that notifies a notification of receipt to the communication device corresponding to the recipient information. The searching system of the communication device may start searching for the imaging device if the communication device receives the receipt notice.

When the readout system readouts the recipient information incorporated in the image data, the data management device includes a receipt notice transmission system that transmits a receipt notice to the communication device corresponding to the recipient information, and when the communication device receives the receipt notice, the communication device executes a notification operation for notifying receipt of the receipt notice to the user of the communication device.

In a particular case, the searching system of the communication device obtains data intrinsic to an imaging device stored in the imaging device which can communicate with the communication device, and the ID information transmitting system transmits the intrinsic information obtained by the searching system as the first identification information to the data management device.

Still optionally, the searching system searches for the imaging device in accordance with a communication method in which intrinsic information is exchanged between communicating devices, and the ID information transmitting system transmits the intrinsic information exchanged by the searching system as the first identification information to the data management device.

Further, the searching system searches for the imaging device within an area in which the searching system can communicate with an imaging device through the wireless LAN, and if a plurality of imaging devices are simultaneously located within the area, the are is reduced until only one imaging device is located in the area.

According to a further aspect of the invention, there is provided a data management device employed in a data management system which includes a plurality of imaging devices that form images represented by image data. The data management device is capable of communicating with the plurality of imaging devices, and the data management system further includes a communicating device that is capable of communicating with the data management device and the imaging devices. In this case, the data management device may be provided with a readout system that readouts recipient information incorporated in the image data representing a recipient of the image represented by the image data from the image data to be processed by one of the plurality of imaging devices, an ID information receiving system that receives first identification information for identifying the imaging device and second identification information for identifying the communicating device from the communication device, and a data transmitting system that transmits the image data from which the recipient information corresponding to the second identification information received by the ID information receiving system to the imaging device which is identified based on the first identification information received by the ID information receiving system.

Optionally, the data transmitting system may transmit the image data to a predetermined imaging device if the readout system does not readout the recipient information form the image data.

Still optionally, when the readout system readouts the recipient information incorporated in the image data, the data management device includes a receipt notification system that notifies a notification of receipt to the communication device corresponding to the recipient information. Further, the searching system of the communication device may be configured to start searching for the imaging device if the communication device receives the receipt notice.

In another case, when the readout system readouts the recipient information incorporated in the image data, the data management device includes a receipt notice transmission system that transmits a receipt notice to the communication device corresponding to the recipient information, and when the communication device receives the receipt notice, the communication device executes a notification operation for notifying receipt of the receipt notice to the user of the communication device.

According to another aspect of the invention, there is provided a communication device employed in a data management system including a plurality of imaging devices that form images represented by image data and a data management device that is capable of communicating with the plurality of imaging devices, the communicating device being capable of communicating with the data management device and the imaging devices. The communicating device may be provided with a searching system that searches for the imaging device that can communicate with the communicating device, and an ID information transmitting system which transmits, when the searching system detects an imaging device, first identification information for identifying the imaging device, together with second identification information for identifying the communicating device, to the data management device.

In a certain case, when the readout system readouts the recipient information incorporated in the image data, the data management device includes a receipt notice transmission system that transmits a receipt notice to the communication device corresponding to the recipient information, and when the communication device receives the receipt notice, the communication device may execute a notification operation for notifying receipt of the receipt notice to the user of the communication device.

Still optionally, the searching system of the communication device may obtain data intrinsic to an imaging device stored in the imaging device which can communicate with the communication device, and the ID information transmitting system transmits the intrinsic information obtained by the searching system as the first identification information to the data management device.

Alternatively, the searching system may search for the imaging device in accordance with a communication method in which intrinsic information is exchanged between communicating devices, and the ID information transmitting system transmits the intrinsic information exchanged by the searching system as the first identification information to the data management device.

Further optionally, the searching system may search for the imaging device within an area in which the searching system can communicate with an imaging device through the wireless LAN, and if a plurality of imaging devices are simultaneously located within the area, the area is reduced until only one imaging is located in the area.

BRIEF DESCRIPTION OF THE DRAWINGS

FIG. 1A is a print setting dialogue including a user ID input section;

FIG. 2 is a flowchart illustrating a BT COMMUNICATION DEVICE REGISTRATION PROCEDURE;

FIG. 3 is a flowchart illustrating a PRINT PROCEDURE according to the first embodiment;

FIG. 8 is a flowchart illustrating a DATA TRANSMISSION/REGISTRATION PROCEDURE executed by a workstation;

DETAILED DESCRIPTION OF THE EMBODIMENTS

Hereinafter, embodiments of the invention will be described with reference to the accompanying drawings.

First Embodiment

Figure 1:
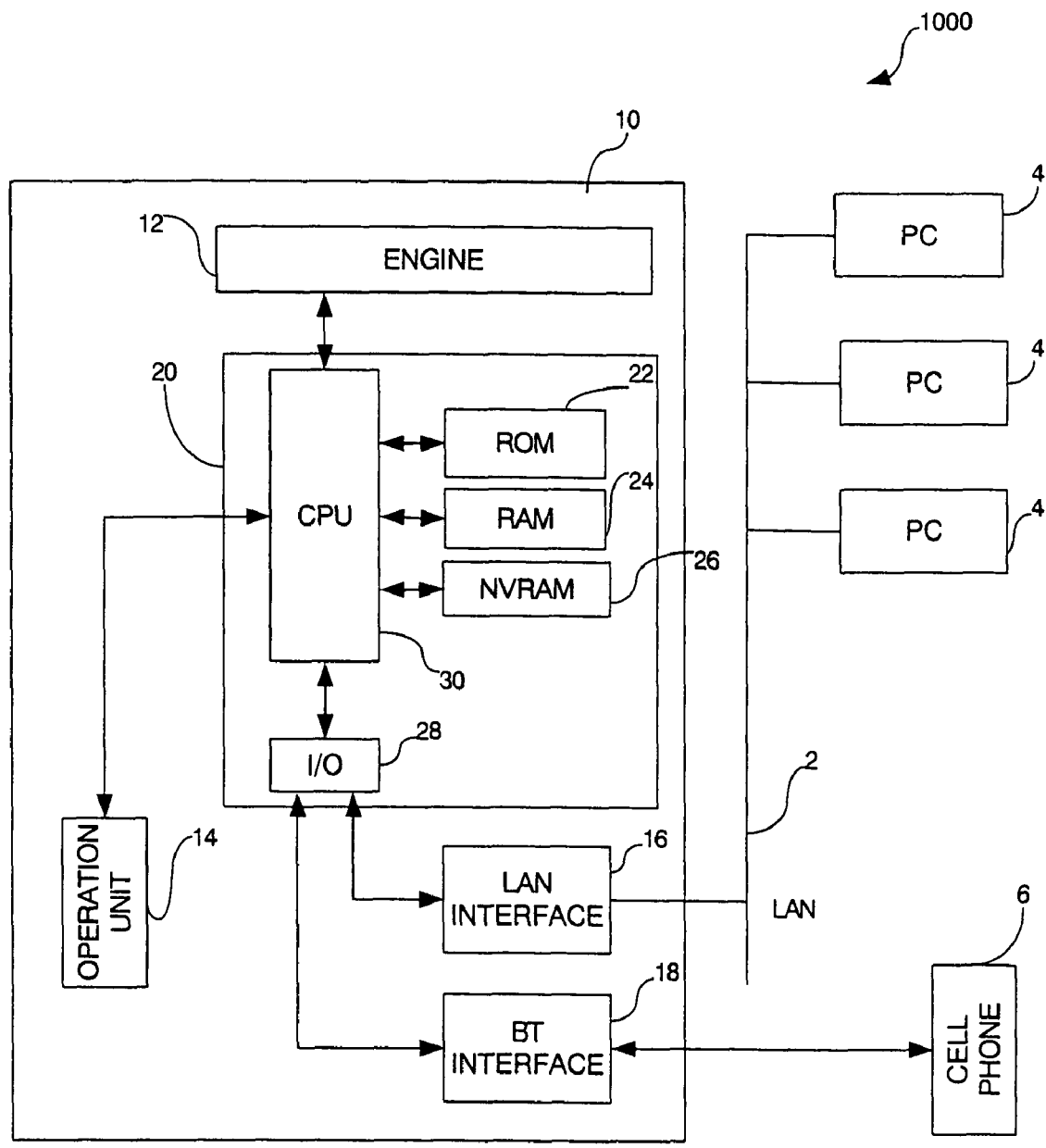
FIG. 1 is a block diagram showing a configuration of a printing system according to a first embodiment.

FIG. 1 is a block diagram showing a configuration of a printing system 1000 according to a first embodiment of the invention.

The printing system 1000 includes a printer 10, a plurality of personal computers (PCs) 4, and a cell phone 6. The printer 10 and the plurality of PCs 4 are interconnected through a LAN (Local Area Network) 2.

The printer 10 includes:

an engine 12 that operates to form an image on a recording sheet;

an operation unit 14 having manually operable keys, through which a user can input various commands, and a display device for displaying various information;

a LAN interface 16 that performs data exchange through the LAN;

a BT (Bluetooth interface) 18 that transmits/receives data in accordance with a Bluetooth communication method; and a main controller 20 that controls the above-described components of the printer 10.

The main controller 20 includes a ROM 22 that stores various programs for operations of the printer 10, a CPU 30 that executes the programs stored in the ROM 22, a RAM 24 that temporarily stores operation results of the CPU 30 and the like, an NVRAM (Non-Volatile RAM) 26, and an I/O port 28 that interfaces input/output of data.

In each PC 4, a print job for printing text and images can be created and a request for printing the same can be transmitted to the printer 10. It should be noted that when a user of a PC 4 executes a printing option, it is possible to set a confidential printing option, which will be described in detail later.

FIG. 1A is an example of a printing option setting dialogue displayed on a display of a PC 4. As shown in FIG. 1A, a check box for the confidential printing and a user ID input box in which a user ID (e.g., a name or company member number etc.) is to be input are included in the printing option setting dialogue. When the check box is checked, it is required that the user ID is input.

If the printing option setting is done with the check box of the confidential printing having been checked and the user ID having been input, when printing data (data representative of an image to be formed on the recording sheet) is transmitted to the printer 10, a command instructing the confidential printing and the user ID as input are also transmitted to the printer 10. If a user ID is intrinsic to each computer, e.g., each PC is used only by a predetermined person and user ID is preliminary input, control may be modified such that input of the user ID in the printing option dialogue may be omitted, and the preliminarily input user ID may be transmitted to the printer 10.

The BT interface 18 communicates with another Bluetooth communication devices. In particular, according to the first embodiment, the cell phone 6 is configured as a Bluetooth communication device.

The Bluetooth communication method will be briefly described hereinafter.

The Bluetooth communication is a wireless communication method using a 2.4 GHz band. A communication area of the Bluetooth communication is approximately 10 through 100 m, depending on a transmission power class. In the first embodiment, each of the BT interface 18 and the cell phone 6 is of class 3, and the BT interface 18 is capable of communicating with the cell phone 6 within a circle whose radius is approximately 10 m. This area in which the BT interface 18 communicates with the cell phone 6 will be referred to as a Piconet area.

According to the Bluetooth method, in a link layer when a communication is initiated, a connection authentication is executed using a secret key called as a Link key.

Specifically, in the BT (Bluetooth) communication devices, for each communicable BT communication device, a BD address thereof and a Link key to be used for communication are stored pairwise.

The Link key used between the two BT devices includes a unit key and a combination key, each of which is a semi-fixed Link key, and an initializing key which is a temporary key. The unit key and the combination key are functionally the same. The former is created based on information of a single BT communication device, while the latter is created based on a combination of the two BT communication devices.

If the semi-fixed Link key (i.e., the unit key or the combination key) with respect to the other BT device has been set, the connection authentication is performed using the Link key. If the semi-fixed Link key has not been set, the initializing key which is a tentative Link key is generated.

Generation of the initializing key will be described.

When the two BT communication devices (which will be referred to as device A and device B) for which the initializing key is generated, firstly, device B which receives connection request generates a random number and send the same to device A, which has transmitted a connection request. At this stage, the BD addresses of the two BT devices have been exchanged therebetween, and become known parameters therebetween.

Device A operates for generating the initializing key in accordance with the BD address of device A, PIN code of device A, and the random number generated by device B. Similarly, device B generates an initializing key in accordance with the BD address of device A, a PIN code of device B and the random number generated by device B. The PIN code is a numerical code preliminary assigned to each communication device. According to the first embodiment, the same PIN code is assigned to the printer 10 and the cell phone 6 which is the BT communication device to communicate with BT.

In each BT communication device, the Link key corresponding to the other BT communication device is stored. The connection authentication between two BT communication devices is executed by examining whether the Link keys stored in the BT communication devices coincide with each other.

The method for judging whether the two Link keys coincide with each other will be described. In the following explanation, the two BT communication devices will be referred to as device C and device D.

Firstly, device D, which receives the authentication request, transmits a random number generated therein to device C which has requested the authentication. It should be noted that the BD addresses of the devices C and D have been exchanged at the initial stage of the communication, and have been recognized by both devices C and D.

Device C performs an operation for the connection authentication using the BD address of device C, the Link key set for device D and the random number generated by device D, and generates a parameter that will be referred to as a parameter SRES. Similarly, device D performs an operation for the connection authentication using the BD address of device C, the Link key set for device C and the random number generated by device D, and obtains a parameter SRES. Device C, then transmits the parameter SRES to device D. Device D compares the parameter SRES calculated therein and the parameter SRES received from device C, and judges whether they coincide with each other.

If device D judges that the two parameters SRES coincide, the connection authentication is established. As described above, in the connection authentication, for the sake of security, whether the Link keys coincide with each other is judged without transmitting the Link keys therebetween.

FIG. 2 is a flowchart illustrating a BT COMMUNICATION DEVICE REGISTRATION PROCEDURE. The procedure is initiated when an input operation for registering a BT communication device with the printer 10 is executed at the operation unit 14.

When the BT COMMUNICATION DEVICE REGISTRATION PROCEDURE is initiated, BT communication devices located within the Piconet area is searched using the BT interface 18 (S100). In S110, a list of BD addresses of the BT devices, which are found to be in the Piconet area, is displayed on the display device of the operation unit 14. It should be noted that the information indicated in the list may be information with which the BT communication devices are distinguished from each other, and names of the BT devices, if assigned, may be displayed instead of the BD addressed thereof.

In S120, it is judged whether one of the BT communication devices indicated in the list has been selected through the operation unit 14. If a BT communication device is selected, control proceeds to S114. In S114, the authentication using the aforementioned initializing key is performed, and in S116, it is judged whether the authentication is established.

If the authentication using the initializing key is not established (S116: NO), control proceeds to S118, where an message indicating that the authentication has been failed is displayed on the display device of the operation unit 14, and the procedure is terminated. If the authentication is established (S116: YES), control proceeds to S120, where a unit key, which is a semi-fixed Link key, is obtained from the BT communication device (alternatively, a combination key with the BT communication device is generated). In S130, the semi-fixed Link key and the user ID input through the BT device are stored in an ID storing area of the NVRAM 26 in a related manner, and the procedure is terminated.

FIG. 3 is a flowchart illustrating a PRINT PROCEDURE according to the first embodiment. The procedure is executed by the CPU 30 of the printer 10. The procedure is initiated when the printing data is received by the printer 10 through the LAN interface 16.

When the PRINT PROCEDURE is initiated, in S200, the received printing data is developed so as to be ready for printing operation. In S210, it is judged whether the confidential print instruction is received together with the printing data.

If the confidential print instruction is not received (S210: NO), control proceeds to S260, and the developed printing data is transmitted to the engine 12 and the printing operation is performed. Then, the PRINT PROCEDURE is terminated. In the following description, printing of an image represented by the printing data will be simply referred to as printing of the printing data.

If it is judged that the confidential printing instruction is received (S210: YES), control proceeds to S220. In S220, a semi-fixed Link key corresponding to the user ID which has been received together with the confidential printing instruction is retrieved from the ID storage area of the NVRAM 26.

In S230, BT communication devices located within the Piconet area are searched using the BT interface 18. Then, in S240, for all the BT communication devices found in S230, the connection authentication is performed using the semi-fixed Link keys retrieved in S220. Thus, the printer 10 functions as device C which was referred to in the above description.

In S250, it is judged whether a BT communication device, with which the connection authentication has been established, exists. If there are no BT devices with which the connection authentication has been established (S250: NO), control returns to S230.

If there is a BT device with which the connection authentication has been established (S250: YES), control proceeds to S260, where the engine 12 is controlled to start printing of the printing data, and then, the PRINTING PROCEDURE is terminated.

Figure 4:
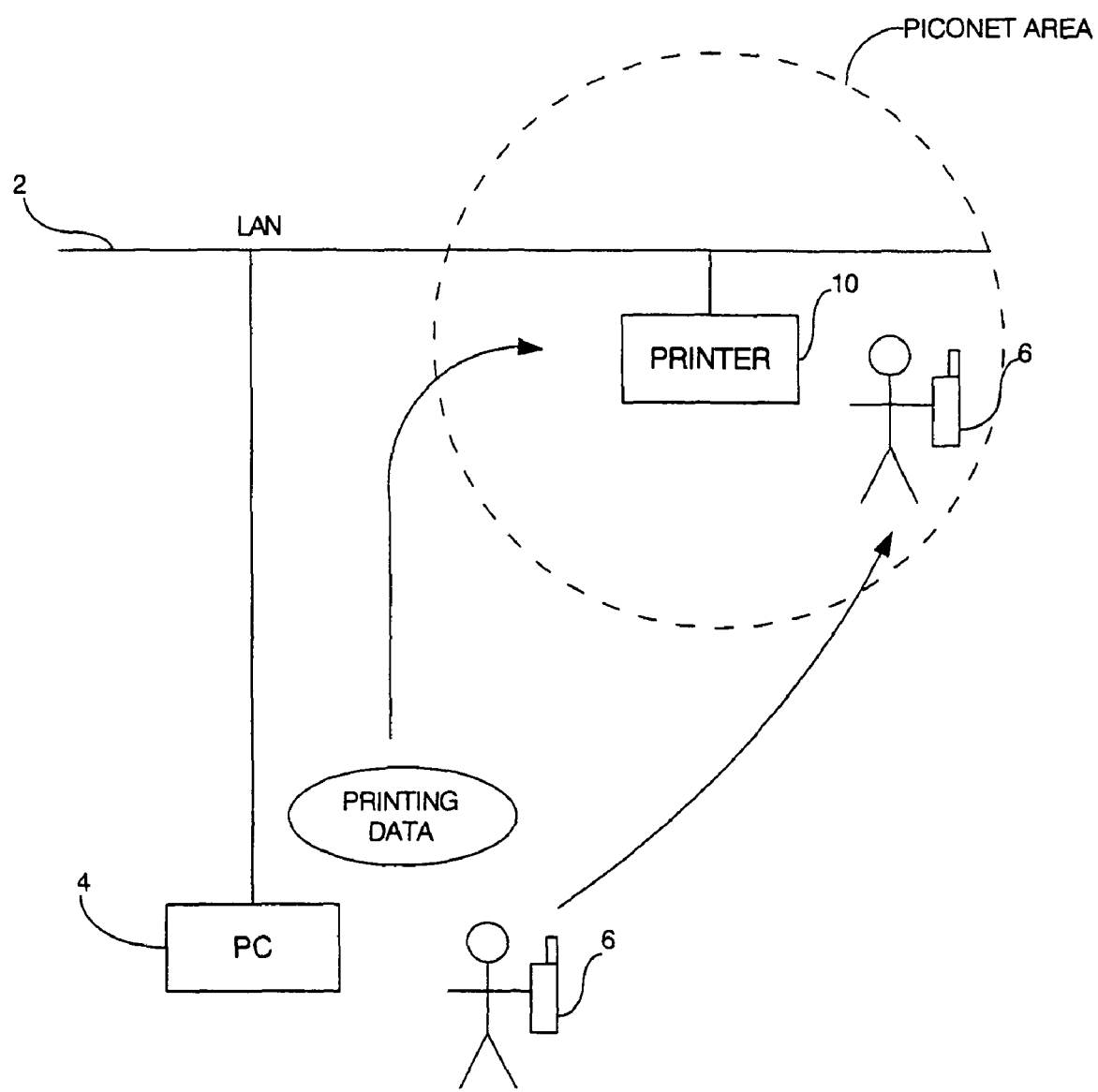
FIG. 4 illustrates an exemplary usage of the printing system where an image on a PC is printed by a printer.

Next, an exemplary usage of the printing system will be described with reference to FIG. 4. In this example, an image stored in the PC 4 is printed with the printer 10, the PC 4 and the printer 10 being connected through the LAN 2.

Initially, a user of the PC 4 registers a cell phone 6 with the printer 10 as a BT communication device. This registration may be done as follows.

The user goes to the printer 10 with holding the cell phone 6 which is powered ON, and initiates an input operation through the operation unit 14 to start the registration of the BT communication devices with the printer 10. With the operation, on the display device of the operation unit 14, the BD addresses of the BT communication devices located in the Piconet area are displayed as a list. Then, the user selects the BD address of the cell phone 6, and further inputs his/her user ID. With this operation, the registration of the cell phone 6 is completed.

When the image on the PC 4 is printed, the user sets whether the confidential printing is performed using the printing option setting dialogue.

If it is unnecessary to set the confidential printing, the check box for the confidential printing is not checked. Then, when the printing is initiated, the printer 10 starts printing of the printing data upon receipt of the same from the PC 4.

If the user intends to perform the confidential printing, the check box in the printing option dialogue is checked, and the user ID is input. Then, when the print command is sent to the printer 10, the confidential printing instruction and the user ID are transmitted to the printer 10 together with the printing data.

The printer 10 develops the printing data so as to be ready for printing when the printing data is received, and searches for, within the Piconet area, the BT communication device with which the connection authentication will be established, using the semi-fixed Link key corresponding to the received user ID (i.e., the printer 10 searches for the cell phone 6 registered by the user of the PC 4).

Thereafter, when the user of the PC 4 enters the Piconet area with the cell phone 6, which is powered ON, the printer detects the cell phone 6, and a printing job is initiated.

With the printer 10 according to the first embodiment, the following advantages are realized.

(a) Printing of the printing data is initiated when the recipient of the printout goes to the printer 10 (i.e., enters the Piconet area), and in this case, an additional operation for initiating the print job is unnecessary.

(b) Since the cell phone 6 is used as the general-use BT communication device, an additional communication device dedicated to the printing system is unnecessary.

(c) When the confidential printing is unnecessary, the print job can be initiated immediately without an unnecessary pausing operation.

It should be noted that, even though the authentication information and the user ID are not registered in the printer 10, when the printing option is set, if the Link key is input by the user instead of the user ID, and is transmitted to the printer 10 together with the printing data, it may be possible that the printer 10 performs the connection authentication using the received Link key. However, in such a configuration, the Link key should be input every time the confidential printing is requested, which is undesirable in view of security.

In the first embodiment, when the confidential printing is requested, the printing is postponed until the BT communication device of an intended user enters the Piconet area. It should be noted that the term confidential is used since this function may likely be used well when the printout is confidential. However, it is apparent that even if the printout is not confidential, when the user simply intends to postpone the print job until he/she enters the Piconet area, the print job can be postponed only by selecting the confidential printing.

In the above-described embodiment, the NVRAM 26 built in the printer 10 is used for storing the authentication data (e.g., the semi-fixed Link key and the user ID). The invention is not limited to this configuration, and can be modified such that the authentication data is stored in an external storage directly connected to the printer 10, a storage (e.g., a hard disk) provided in an external apparatus (e.g., the server) connected to the printer 10 through the network, or the like.

Second Embodiment

A structure of the printer according to the second embodiment is substantially the same as that of the first embodiment except that a size of the communication area of the BT interface 18 and the PRINT PROCEDURE executed by the CPU 30 are different. Therefore, in the following description of the second embodiment, components similar to those in the first embodiment are given the same reference numerals and description thereof will be simplified.

In the second embodiment, the transmission power of the BT interface 18 and the cell phone 6 fall within class 1. Accordingly, the BT interface 18 is capable of communicating with the cell phone 6 (BT communication device) within a circle whose radius is approximately 100 m (i.e., the radius of the Piconet area is approximately 100 m).

Figure 5:
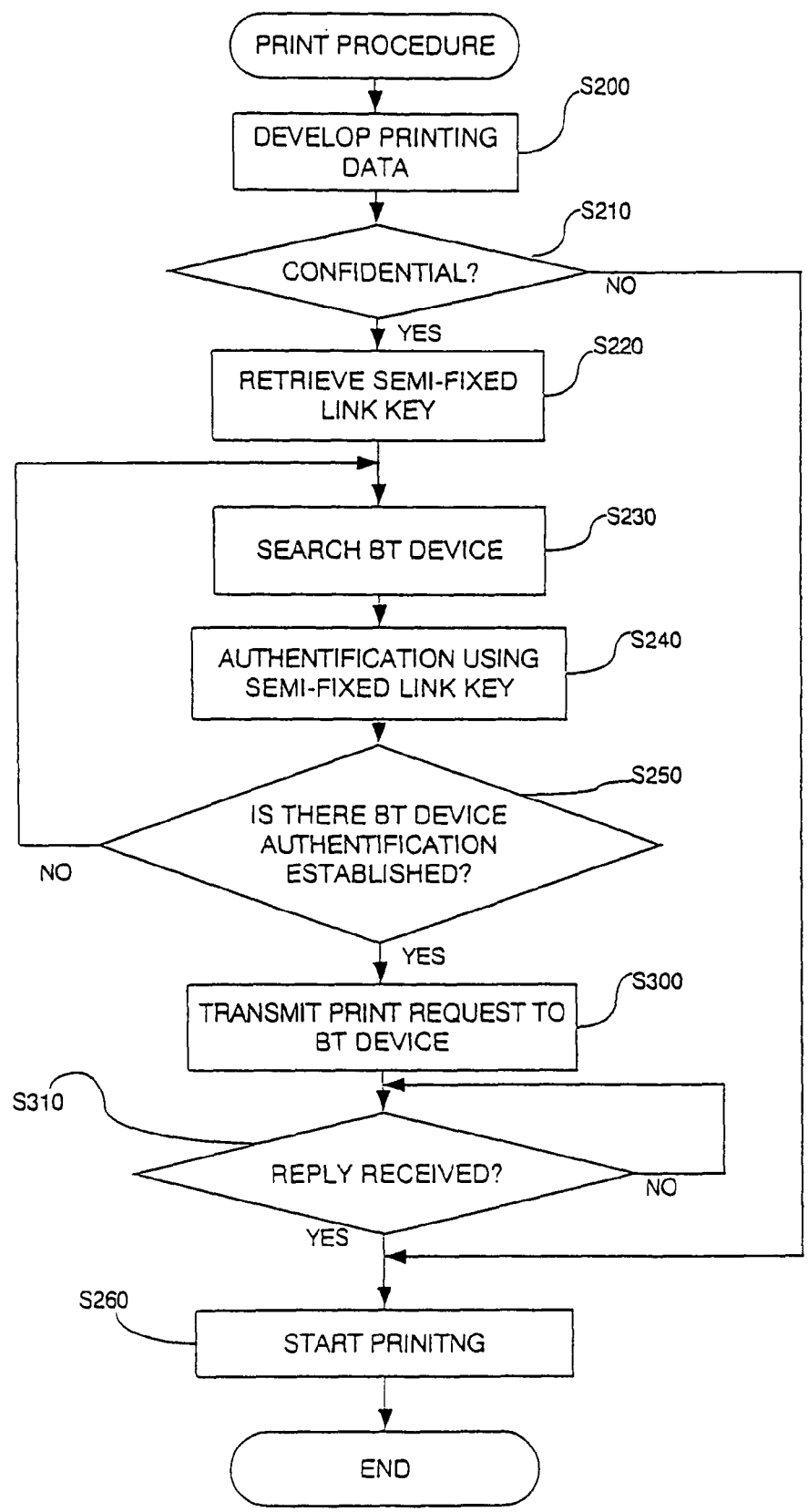
FIG. 5 is a flowchart illustrating a PRINT PROCEDURE according to a second embodiment.

FIG. 5 is a flowchart illustrating a PRINT PROCEDURE according to a second embodiment.

The PRINT PROCEDURE shown in FIG. 5 is different from that shown in FIG. 3 in that steps S300 and S310 are inserted between steps S250 and S260. Since S200-S260 have been described, description thereof will not be repeated, and S300 and S310 will be described.

When it is judged, in S250, that there is a BT communication device with which the connection authentication has been established (S250: YES), control proceeds to S300. In S300, a request for permission of printing is transmitted to the BT communication device with which the connection authentication has been established.

In S310, control waits for a reply to the permission request transmitted in S300. If the reply is received (S310: YES), control proceeds to S260, and a print job is initiated.

Thus, according to the second embodiment, even though the BT communication device, with which the connection authentication has been established, is detected, a print job is not initiated automatically. Instead, the print permission request is transmitted to the detected BT communication device, and waits for the replay thereto. Accordingly, the user of the BT communication device wishes that the print job is started immediately, he/she may transmit a reply to the printer 10. Upon receipt of the reply (S310: YES), the print job is initiated.

Figure 6:
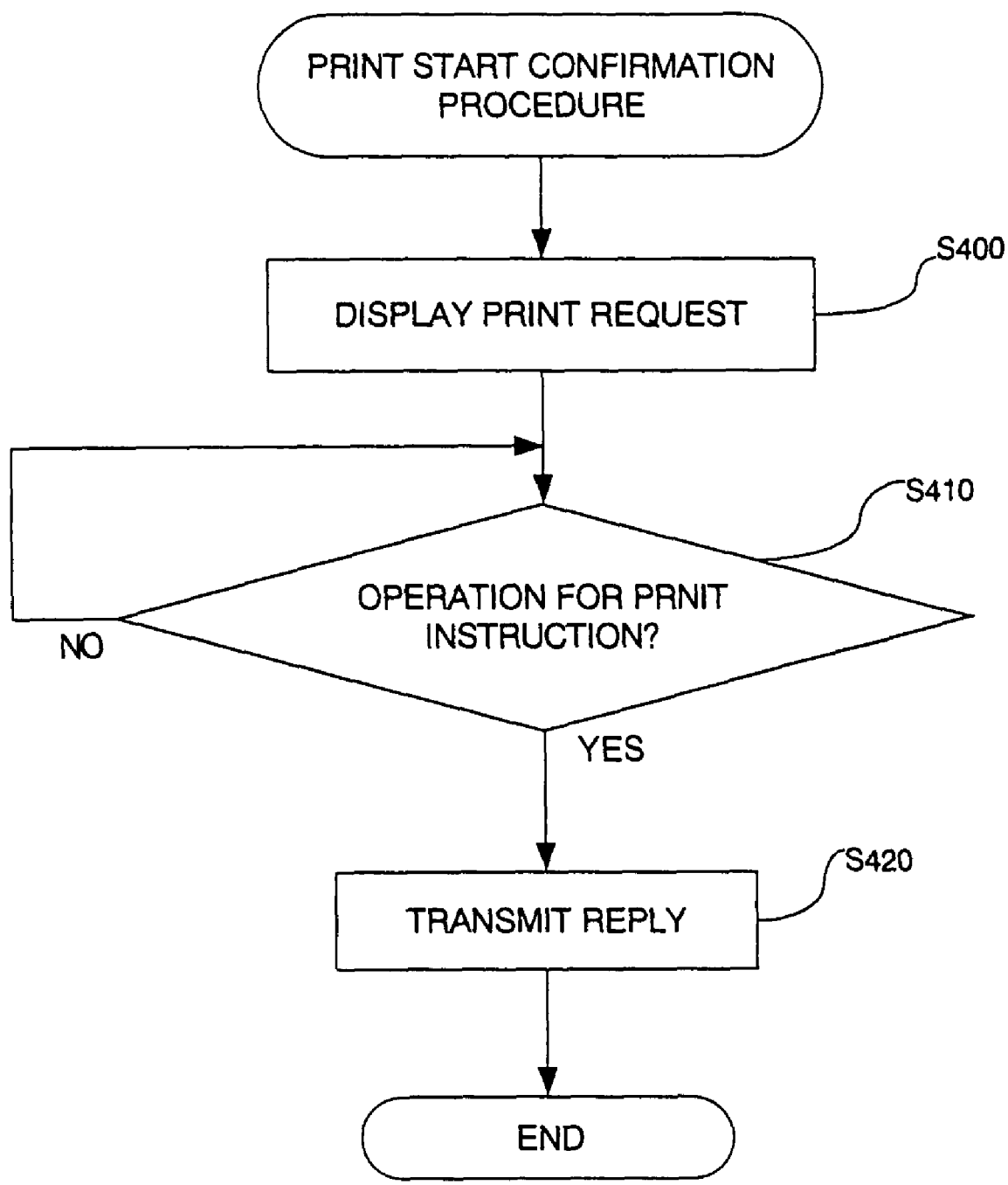
FIG. 6 is a flowchart illustrating a PRINT START CONFIRMATION PROCEDURE.

FIG. 6 is a flowchart illustrating a PRINT START CONFIRMATION PROCEDURE executed by the cell phone 6. The procedure shown in FIG. 6 is initiated when the print permission request, which was transmitted by the BT interface 18 (S300 in FIG. 5), is received.

When the PRINT START CONFIRMATION PROCEDURE is initiated, in S400, a message asking the user of the cell phone 6 whether the print job is to be started is displayed on a display device of the cell phone 6.

If the user wishes to start the print job, he/she operates a predetermined key of the cell phone 6. If the predetermined key is operated (S410: YES), control proceeds to S420, at which the reply is transmitted to the printer 10, and the procedure is terminated. It should be noted that the operation in S410 may be done by a simple inputting operation, such as an operation of a single key.

Next, an exemplary usage of the second embodiment will be described.

As in the example for the first embodiment, it is assumed that a user of a PC 4 registers his/her cell phone 6 with the printer 10, and operates the PC 4 to execute a confidential printing operation. Then, the user goes toward the printer 10 and enters the Piconet area. When the user enters the Piconet area, the printer detects the BT communication device (i.e., the cell phone 6).

According to the second embodiment, the print job is not initiated at this stage. When the user enters the Piconet area, a message asking the user whether the print job is started or not is displayed on the display device of the cell phone 6. If the user intends to, he/she operates the predetermined key to start the print job. Upon operation of the predetermined key of the cell phone 6, the reply is transmitted to the printer 10, and the print job is started immediately.

According to the second embodiment, the following advantages can be achieved.

That is, since the cell phone 6 is used as the general-use BT communication device, an additional communication device dedicated to the printing system is unnecessary.

Further, when the confidential printing is unnecessary, the print job can be initiated immediately without an unnecessary pausing operation and confirmation operation.

Further, according to the printer 10, the recipient of the printout can determine whether the print job is to be started. Accordingly, when the recipient is within the Piconet but not close to the printer 10, the user may postpone the print job. Thus, it is possible to prevent unintentional initiation of the print job. Therefore, the confidentiality can be maintained.

Further, only by a simple operation of the cell phone 6, the print permission is instructed to the printer 10.

It should be noted that the printer 10 according to the second embodiment has a function of not starting the print job until the user (i.e., the recipient) permits the execution of the print job. This confirmation function is particularly advantageous when the Piconet area is relatively wide as in the second embodiment.

Further, if the confirmation function can be turned ON/OFF by the PC 4 or the like, it is convenient. That is, selective usage of such a function depending on an environment of the printer 10 will be convenient. Alternatively or optionally, the confirming function may be switched ON/OFF depending on the width of the Piconet area. Preferably, the confirmation function may be turned ON when the Piconet area is relatively wide, while the confirmation function may be turned OFF when the Piconet area is relatively small. It may be further convenient if the switching ON/OFF of the confirmation function is automatically performed. Such a configuration can be achieved by selecting the procedures shown in FIG. 3 or FIG. 5 depending on the environment of the printer 10 (e.g., the width of the Piconet area).

It should be noted that the above-described printing systems are exemplary embodiments of the invention, and can be modified in various ways.

For example, the printer 10 according to the first and second embodiments, as the authentication information, the semi-fixed Link key is registered in relationship to the user ID. However, the invention is not limited to such a configuration, and for example, the BD address is registered as the authentication information, and connection authentication may be executed using an initializing key that is generated using the BD address as registered.

In the printer 10 according to the first or second embodiment, the confidential printing can be executed when the BT communication device is detected. Alternatively or optionally, the printer may be further modified such that the confidential printing is started when a user ID, password or the like is input through the operation unit 14 of the printer 10. In this case, it may be possible to start a confidential printing when the cell phone 6 enters the Piconet area or the predetermined key input is performed at the operation unit 14. Alternatively, it may be possible that different confidential print jobs may be initiated depending on whether the cell phone 6 enters the Piconet area or the key input is performed through the operation unit 14. In the latter case, when the printing option is input on the PC 4, one of a plurality of types of confidential printing methods may be selected.

The printer 10 described above communicates with the cell phone 6 in accordance with the Bluetooth communication method. However, the invention is not limited to such a configuration, and, the printing system having the similar function may be realized even if another type of communication device and/or another type of communication method is employed. It should be noted, however, the printer 10 is required to distinguish individual communication devices, and thus, the communication method to be employed should perform a communication authentication using the authentication information intrinsic to each communication device.

Further, in the first and second embodiments, as the BT device communication with the printer 10, the cell phone 6 is used. However, the invention is not limited to this configuration and any other BT devices (e.g., a wrist watch having the BT function) may be used as the device communicating with the printer 10. It should noted, however, when the confirmation is required as in the second embodiment, the BT device needs to be provided with an notification system (e.g., a display device) and an input device through which the user transmits permission of execution of a print job. Therefore, in such a configuration, it is preferable that a PDA, PHS and the like may be used instead of the cell phone 6.

In the above embodiments, the printer 10 is employed in the printing system. The invention is not limited to this configuration, and a facsimile device or an MFP (multi-function peripheral) may be used in place of or in addition to the printer 10.

Still further, in the first and second embodiments, it is assumed that the user of the PC 4 is the recipient of the printout. It is apparent that the user of the PC 4 and the recipient of the printout can be different. In this case, the confidential document transmitted from the user of the PC 4 to the recipient, who is different from the user of the PC 4, will not be viewed by another person.

In the above-described embodiments, the printing data is transmitted from the PC 4 to the printer 10. However, the invention is not limited to this configuration, and the data transmission between facsimile devices may be subject to the present invention.

In FIG. 5, if the reply is not received from the cell phone 6, step S310 is repeated. This may be modified such that, the procedure shown in FIG. 5 is terminated if the reply is not received after a predetermined time period has elapsed since the transmission of the permission request. Alternatively, the control may be modified to proceed from S310 to S260 if the reply is not received after a predetermined time period has elapsed since the permission request was transmitted.

Third Embodiment

Figure 7:
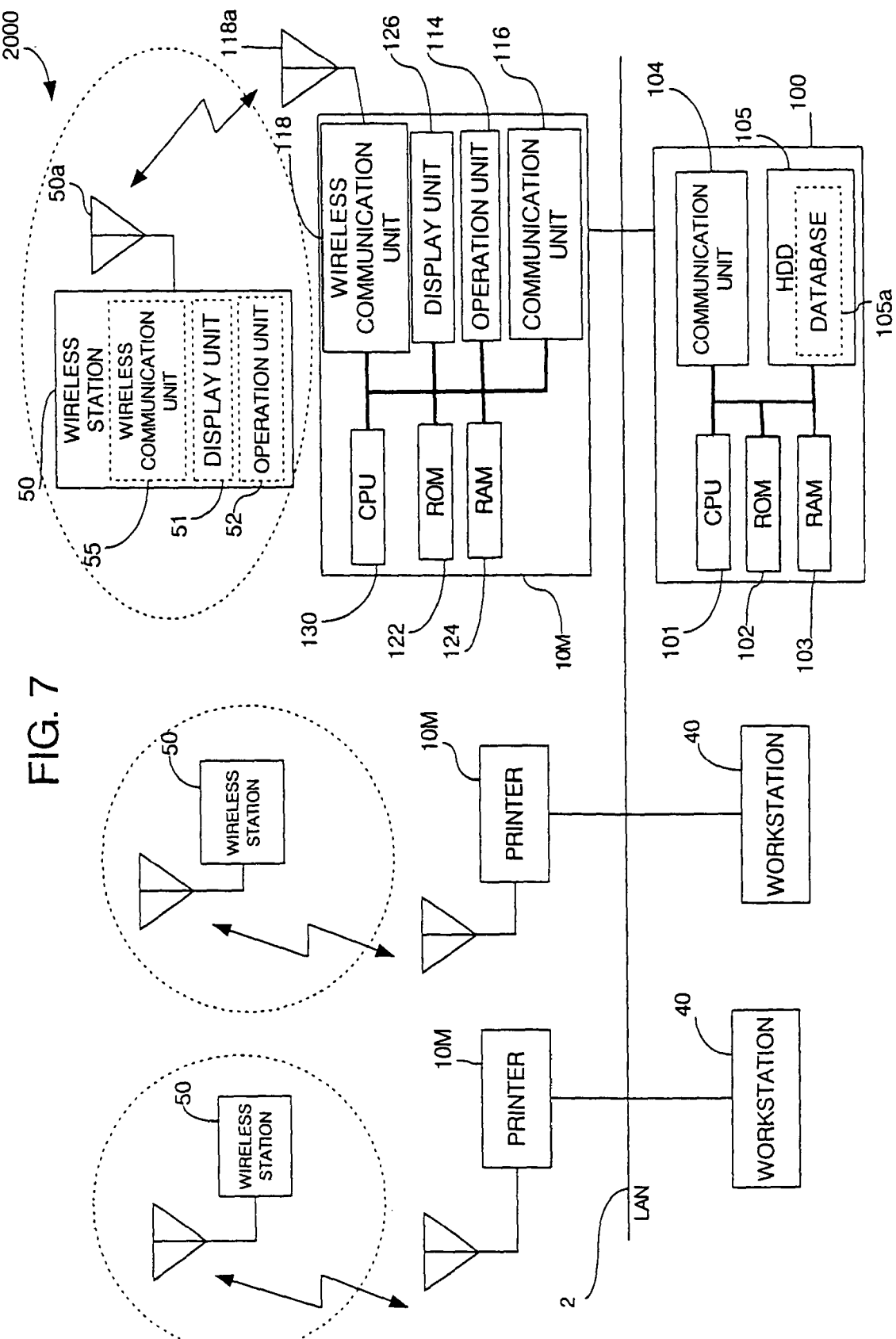
FIG. 7 is a block diagram of a data management system according to a third embodiment of the invention.

FIG. 7 is a block diagram of a data management system 2000 according to a third embodiment of the invention.

As shown in FIG. 7, the data management system 2000 includes a file server 100 that stores and manages image data files representative of letters, characters, symbols and figures to be printed, a plurality of printers 10M, a plurality of workstations 40, which are interconnected through a network (LAN) 2 so that bi-directional data communication can be performed therebetween.

The server 100 of the data management system 2000 includes a CPU 101 that controls entire operation of the server 100, a ROM 102 that stores programs to be executed by the CPU 101, a RAM 103 that temporarily stores data when the programs are executed by the CPU 101, and a communication unit 104 that performs the bi-directional data communication with the printers 10M and/or workstations 40 through the network 2. The server 100 further includes a hard disk drive (HDD) 105, and in the HDD 105, a database (DB) 105a is constructed, which is used for managing image data (hereinafter referred to as printing data) to be printed by the printers 10M.

Each of the printers 10M includes a CPU 130 for controlling the entire operation of the printer 10M, a ROM 122 that stores programs to be executed by the CPU 130, a RAM 124 that temporarily stores data when the programs are executed by the CPU 130, a communication unit 116 through which the bi-directional data communication is performed with the workstations 40 and/or the other printers 10M through the network 2. Further, the printer 10M includes a wireless communication unit 118 provided with an antenna 118a. The wireless communication unit 118 performs a bi-directional communication with an external wireless station 50 within a predetermined area (indicated by dotted line). Further, the printer 10M is provided with a display unit 126 including an LCD that displays operation status or the like of the printer 10M for a user, and an operation unit 114 including key switches and the like, through which the user can input various commands to operate the printer 10M.

Each of the wireless stations 50 includes a wireless communication unit 55 for performing the bi-directional wireless data communication with the printer 10M, a display unit 51 that displays information based on display data received through an antenna 50a and the communication unit 55.

Each wireless station 50 is assigned with a user ID for identifying a user of the wireless station 50. The wireless communication unit 55 transmits the user ID when a wireless data communication is performed with the printer 10M. Examples of such a wireless station 50 are mobile computers, cell phones and the like.

In the above-described data management system 2000, a printer 10M closest to a current position of a user having a wireless station 50 is used for printing the printing data stored in the file server 100 by controlling the server 100, printers 10M and wireless stations 50 to operate as follows.

Before printing, the user operates the workstation 40 to register printing data with the database 105a.

That is, when the user input a command instructing transmission of printing data to the workstation 40, the CPU of the workstation 40 executes a DATA TRANSMISSION/REGISTERATION PROCEDURE shown in FIG. 8 to register the printing data with the data base 15a of the server 100.

FIG. 8 is a flowchart illustrating the DATA TRANSMISSION/REGISTRATION PROCEDURE.

When the DATA TRANSMISSION/REGISTRATION PROCEDURE is initiated, in S510, the data designated by the user is retrieved from a recording medium (e.g., a built-in hard disk, a flexible disk and the like) accessible by the workstation 40. In S520, an input window is displayed on a displaying device connected to the workstation 40 to require the user to input an ID (hereinafter referred to as a sender ID) of the user who is registering the printing data with the data base 105a, and an ID (hereinafter referred to as a recipient ID)

of a target user (i.e., a recipient) who is supposed to receive the printout of the printing data about to be registered.

In S530, the workstation 40 receives the sender ID and the recipient ID, which may be input by the user. It should be noted that the sender ID and the recipient ID are stored as default IDs and will be used in the subsequent execution of this procedure until the user input new IDs. With such a configuration, the operation is simplified such that the user need not input the same IDs every time the procedure shown in FIG. 8 is executed.

When the steps S510-S530 have been finished, the workstation 40 creates a job ID based on, for example, the file name of the printing data (S540). In S550, the IDs (i.e., the sender ID, recipient ID and the job ID) and the printing data are put into a packet (e.g., IP packet if TCP/IP is employed as a communication protocol), which is transmitted to the server 100.

Figure 9A:
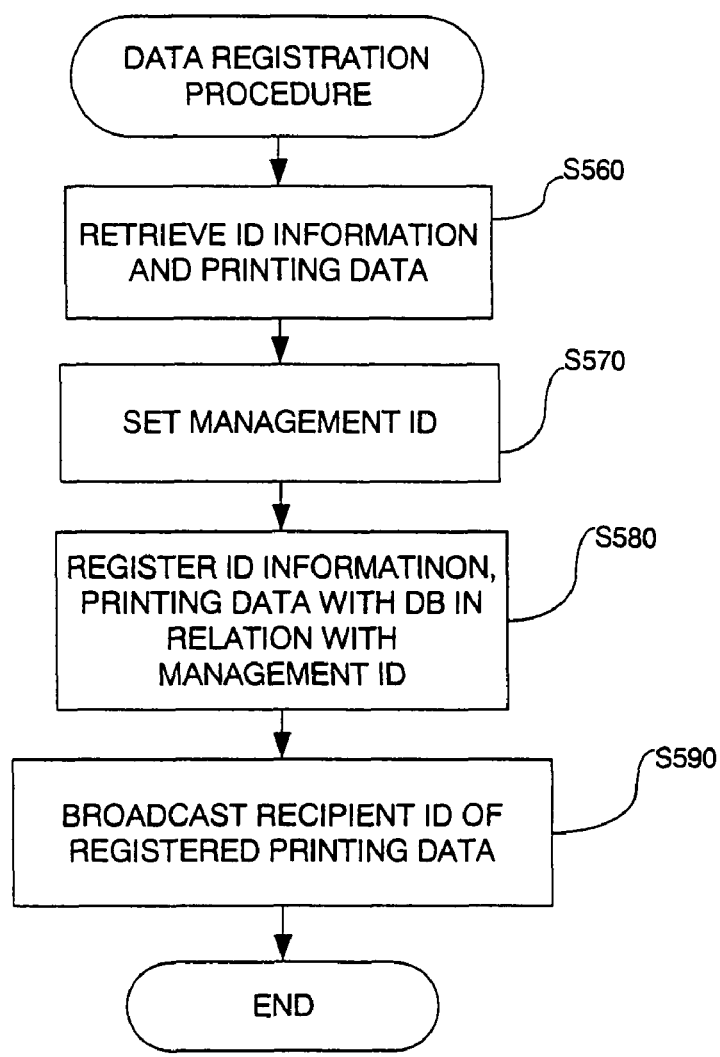
FIG. 9A is a flowchart illustrating a DATA REGISTRATION PROCEDURE executed by a server.

When the server 100 receives the packet containing the printing data and the IDs, which packet was transmitted from the workstation 40, with the communication unit 104, the CPU 101 executes the DATA REGISTERATION PROCEDURE shown in FIG. 9A to register the printing data with the data base 105a.

FIG. 9A is a flowchart illustrating the DATA REGISTRATION PROCEDURE executed by the CPU 101 of the server 101.

When the procedure is initiated, the IDs and printing data are extracted from the received packet (S560), to which a management ID is assigned (S570). In S580, the IDs and the printing data are stored in relationship to the management ID.

Figure 9B:
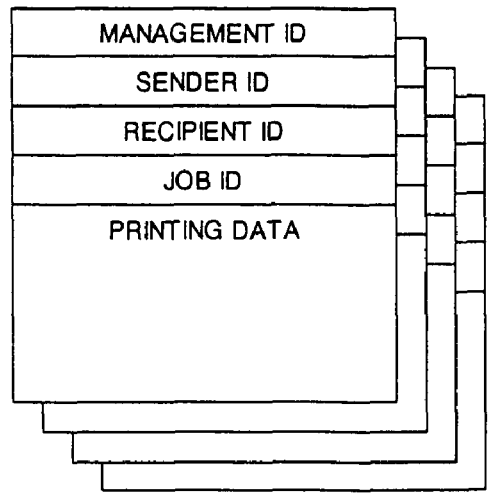
FIG. 9B shows a data structure of a database.

FIG. 9B shows a data structure of a piece of data stored in the data base 105a. It should be noted that the management ID is an ID assigned to each piece of printing data and intrinsic thereto. A management ID is not assigned to a plurality of pieces of printing data in the data base 105a. Thus, when one management ID is designated in the data base 105a, one piece of printing data is identified.

When step S580 is done, the server 10 transmits a packet containing the recipient ID of the registered data to all the printers 10M in the network (S590) to notify registration of new data in the data base 105a (hereinafter the packet will be referred to as a registration notification).

Figure 10:
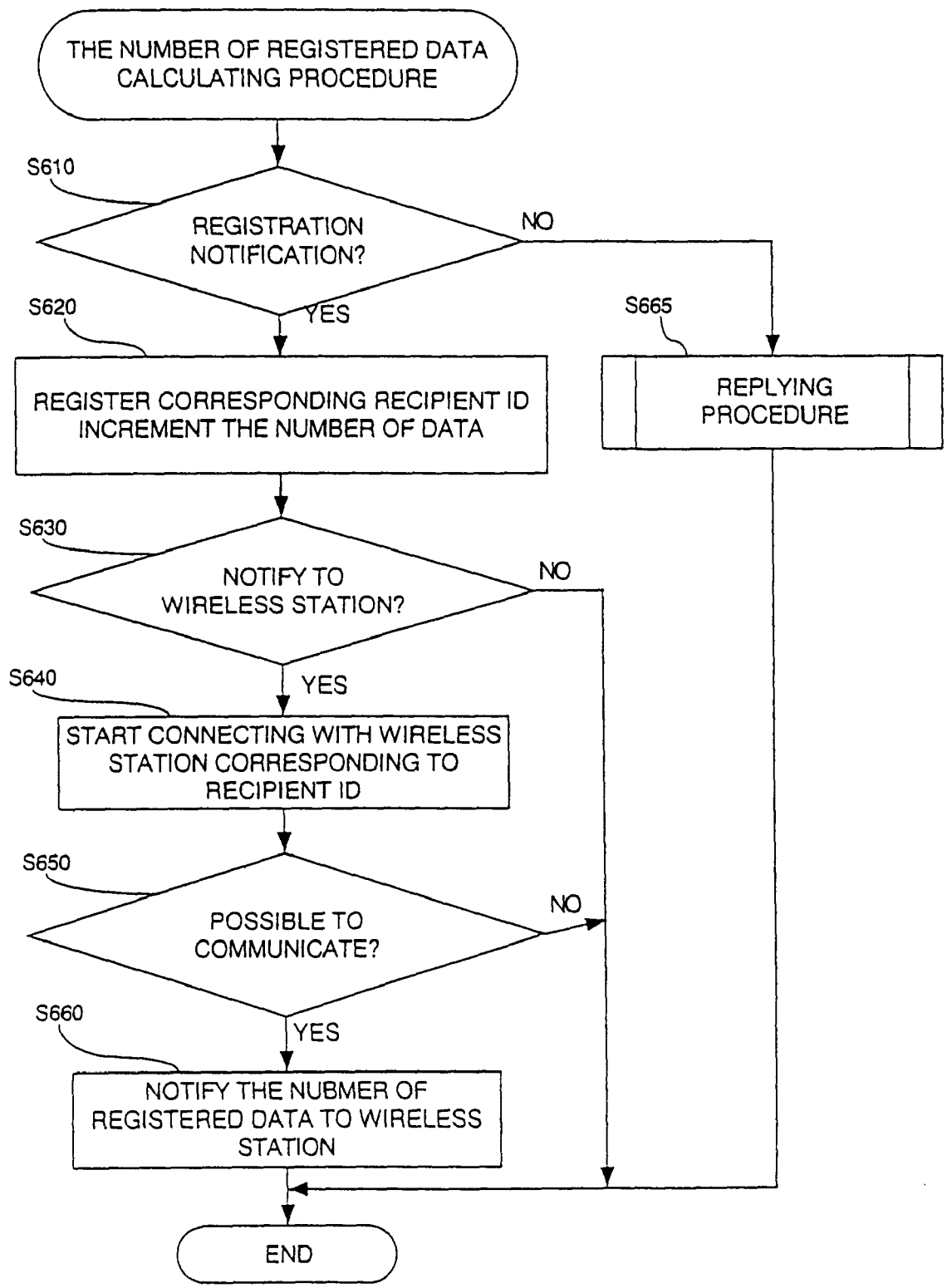
FIG. 10 is a flowchart illustrating a THE NUMBER OF REGISTRED DATA CALCULATING PROCEDURE performed by a printer.

Each printer 10M of the data management system 2000 executes a NUMBER OF REGISTERED DATA CALCULATING PROCEDURE shown in FIG. 10 to calculates the number of pieces of the printing data of the user whose recipient ID is the same as the received recipient ID.

FIG. 10 is a flowchart illustrating the NUMBER OF REGISTERE DATA CALCULATING PROCEDURE performed by each printer 10M.

When each printer 10M receives a packet from the server 100, in S610, it is judged the received packet is the registration notification. If the received packet is not the registration notification (S610: NO), a REPLYING PROCEDURE (see FIG. 15) is called in S665. If the received packet is the registration notification (S610: YES), control proceeds to S620, where the number of the pieces of the registered data corresponding to the recipient ID contained in the registration notification is incremented by one. If there is no registered data corresponding to the recipient ID, it is newly stored in the RAM 124 in relationship to the recipient data, with the number of the pieces of the registration data being set to one.

In S630, it is judged whether the number of the pieces of the registered data is to be notified to wireless stations 50. If the notification is unnecessary (S630: NO), the procedure shown in FIG. 10 is terminated. If it is necessary (S630: YES), control proceeds to S640. It should be noted that it is convenient if a decision condition for S630 can be changed by the user. That is, if the condition for S630 is determined such that the notification is necessary when the number of the pieces of the registered data exceeds n, and the number n is changeable by the user, the user can adjust the interval between notifications.

In S640, the printer 10M starts communicating with the wireless station 50 having the user ID same as the recipient ID contained in the registration notification. When the connection is established, i.e., when the printer 10M and the wireless station 50 are connected to perform bi-directional communication (S650: YES), then the printer 10M transmits the number of the pieces of the registered data to the wireless station 50 (S660). If the connection is not established (S650: NO), the procedure is terminated although the notification is not made to the wireless station 50.

For example, when the wireless station 50 and the printer 10M communicate through a wireless LAN, the following procedure is performed. Firstly, the printer 10M collects the user IDs from the accessible wireless stations 50 (i.e., located within an accessible area) through the wireless communication. Then, the printer 10M judges whether an ID corresponding to the recipient ID is included in the collected user IDs (S640).

If the user ID identical to the recipient ID is included in the collected user IDs, the judgment in S650 is YES, and in S660, the number of the pieces of the registered data is notified to the printer having the user ID identical to the recipient ID.

In the above-described embodiment, the printer 10M collects the user IDs of the wireless stations 50 located in the accessible area. However, the invention is not limited to such a configuration, and the wireless stations 50 are configured to transmit their user IDs periodically to the printers 10M. Alternatively, the wireless stations 50 may transmit their user IDs when they receive a request command therefor from the printer 10M.

Further, procedure in steps S640 through S660 is a non-restrictive exemplary procedure and may be modified appropriately.

Figure 11:
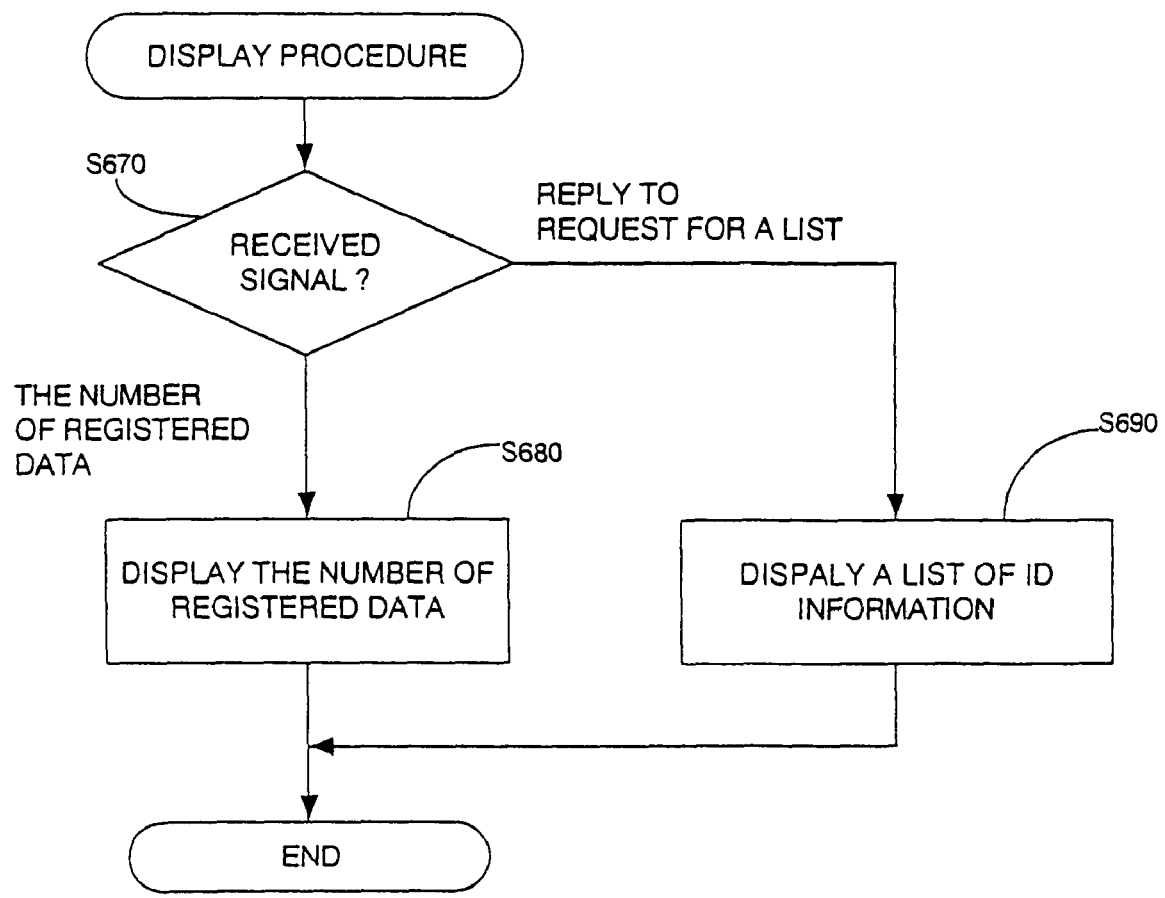
FIG. 11 is a flowchart illustrating a DISPLAY PROCEDURE executed by a wireless transmitter/receiver.

When the wireless station 50 receives a wireless signal from the printer 10M through the antenna 50a, a DISPLAY PROCEDURE shown in FIG. 11 is initiated.

FIG. 11 is a flowchart illustrating a DISPLAY PROCEDURE executed by the wireless station 50.

When the wireless station 50 receives a signal, it judges, in S670, whether the received signal represents data related to the number of pieces of the registered data. If it is judged that the received signal represents the number of the pieces of the registered data, the number is displayed on the display 51 (s680). If it is judged that the received signal represents data responding to a list request that request for a list of the pieces of the printing data stored in the data base 105a, control proceeds to S690.

In S690, based on the data which is a response to the list request is displayed in S690, i.e., the ID information of the printing data (i.e., the management ID, sender ID and user ID) is displayed in the form of list.

As described above, the wireless station 50 includes an operation unit 52, through which the user can input various commands, which are transmitted to the printer 10M.

Figure 12:
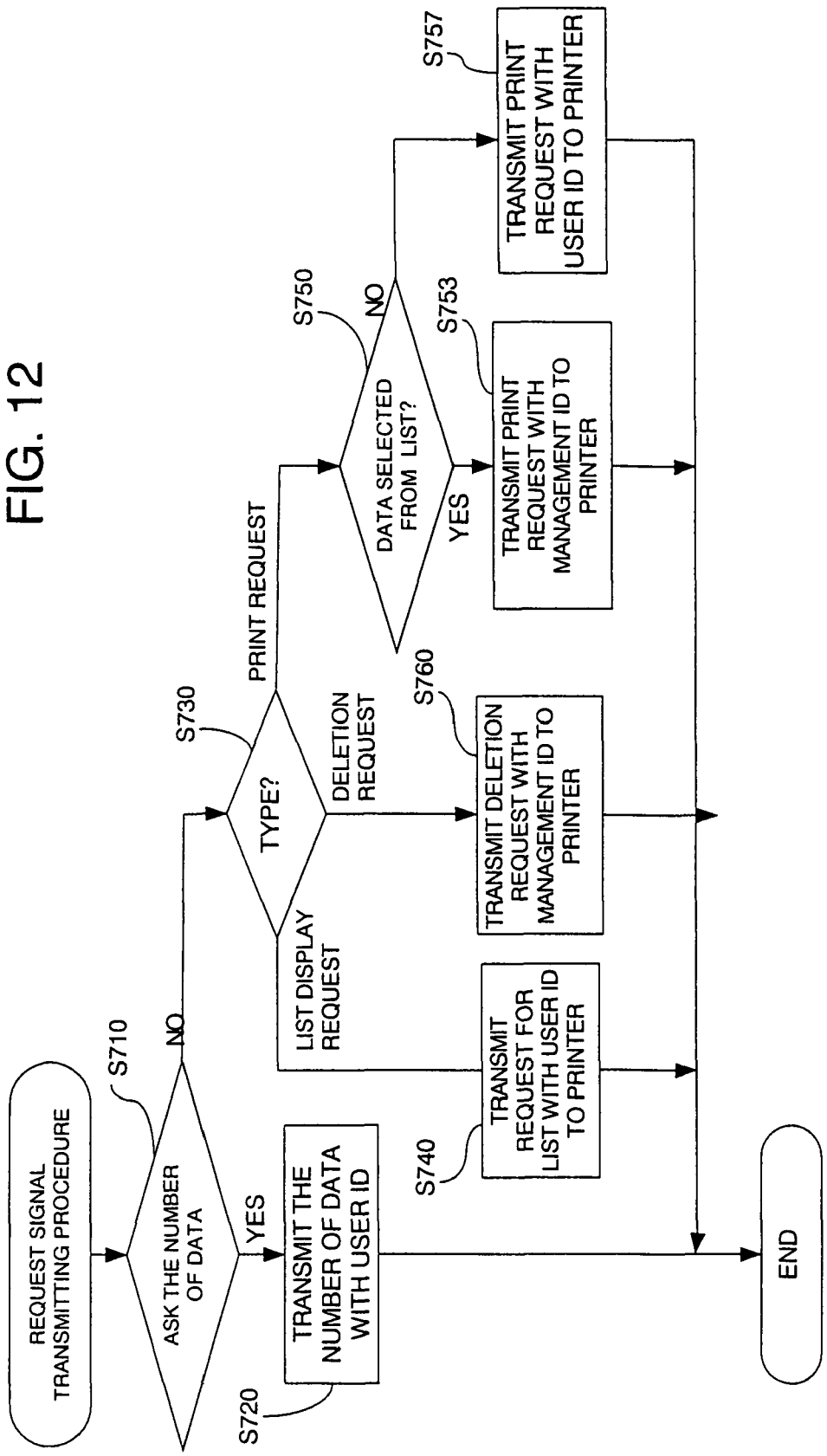
FIG. 12 is a flowchart illustrating a REQUEST SIGNAL TRANSMITTING PROCEDURE executed by the wireless transmitter/receiver.

FIG. 12 is a flowchart illustrating a REQUEST SIGNAL TRANSMITTING PROCEDURE executed by the wireless station 50 when the operation unit 52 is operated.

In S710, it is judged whether the input command requests for the number of the pieces of the registered data. If the received command requests for the number of the pieces of the registered data (S710: YES), control proceeds to S720, where a request for notification of the number of the registered data is transmitted together with the user ID assigned to the wireless station 50.

If the input command is not the request for the number of the pieces of the registered data (S710: NO), control proceeds to S730, where the type of the input command is determined.

If the input command is a request for display of a list of the printing data registered n the data base 105*a*, control proceeds to S740, where the request for the list is transmitted by the communication unit 55 to the printer 10M together with the user ID assigned to the wireless station 50.

If the input command is a request for printing, it is further judges at S750 whether the printing data subject to the printing is the data selected from the list which is requested in S720 and displayed in S690 of FIG. 11. If the data to be printed is the data selected from the list (S750: YES), control designates the printing data subject to the request for printing by its management ID and transmits the request for printing to the printer 10M together with the management ID (S753). If the printing data subject to the request for printing is not selected (S750: NO), the request for printing is transmitted to the printer 10M together with the user ID assigned to the wireless station 50.

If the input command is a request for deletion of a piece of printing data from the data base 105*a*, the deletion request is transmitted to the printer 10M together with the management ID of the printing data to be deleted (S760).

Figure 13:
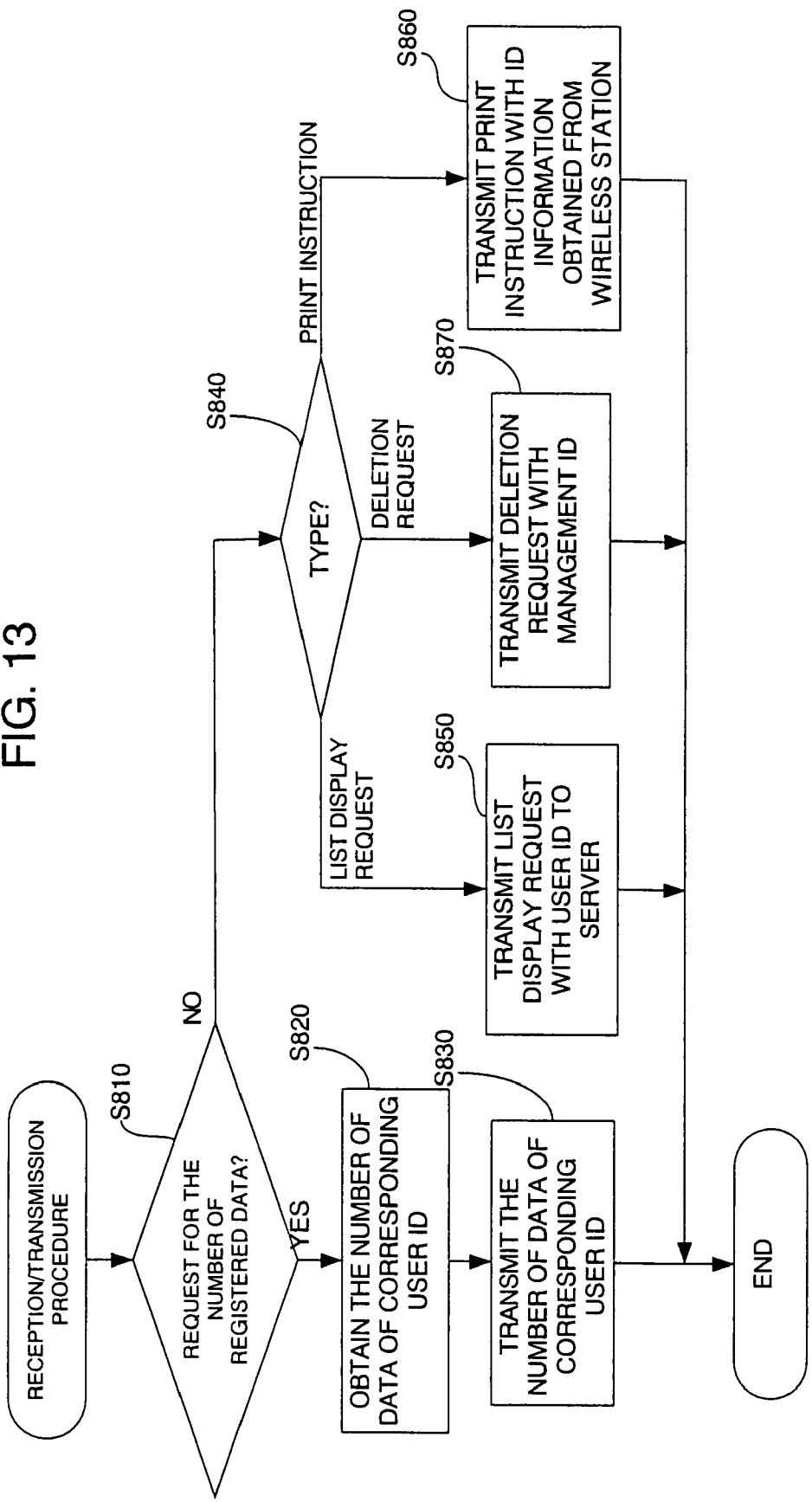
FIG. 13 is a flowchart illustrating a RECEPTION/TRANSMISSION PROCEDURE executed by a printer.

When the printer 10M receives the wireless signal from the wireless station 50, a RECEPTION/TRANSMISSION PROCEDURE shown in FIG. 13 is executed.

FIG. 13 is a flowchart illustrating the RECEPTION/TRANSMISSION PROCEDURE executed by the CPU 21 of the printer 10M.

In S810, it is judged whether the received signal represents the request for the number of the pieces of the registered data (i.e., the notification request). If the received data is the notification request (S810: YES), control proceeds to S820, where, based on the user ID contained in the received signal, the number of the pieces of the registered data whose recipient IDs coincide with the user ID of the wireless station 50 are retrieved from the list of the number of the pieces of the registered data stored in the RAM 124. Then, in S830, the number of the pieces of the registered data having the recipient ID identical to the user ID of the wireless station 50 which transmitted the notification request is transmitted to the wireless station 50.

If it is judged that the received signal is not the notification request (S810: NO), control proceed to S840, where the type of the received signal is judged.

If the signal received from the wireless station 50 represents a request for a list of the registered data, control proceeds to S850 and the request for display of the list is transmitted from the communication unit 116 to the server 100 together with the user ID of the wireless station 50.

If the signal received from the wireless station 50 represents a request for printing, control proceeds to S860 and the request for printing (i.e., print instruction) is transmitted from the communication unit 116 to the server 100 together with the ID information including the user ID of the wireless station 50 and the management ID identifying the printing data subject to be printed.

If the signal received from the wireless station 50 represents a request for deletion of a piece of printing data, control proceeds to S870 and the request for deletion is transmitted from the communication unit 116 to the sever 100 together with the ID information including the management ID identifying the printing data subject to be deleted.

After the transmission of data/request in S830, S850, S870 or S860, the procedure shown in FIG. 13 is terminated.

Figure 14:
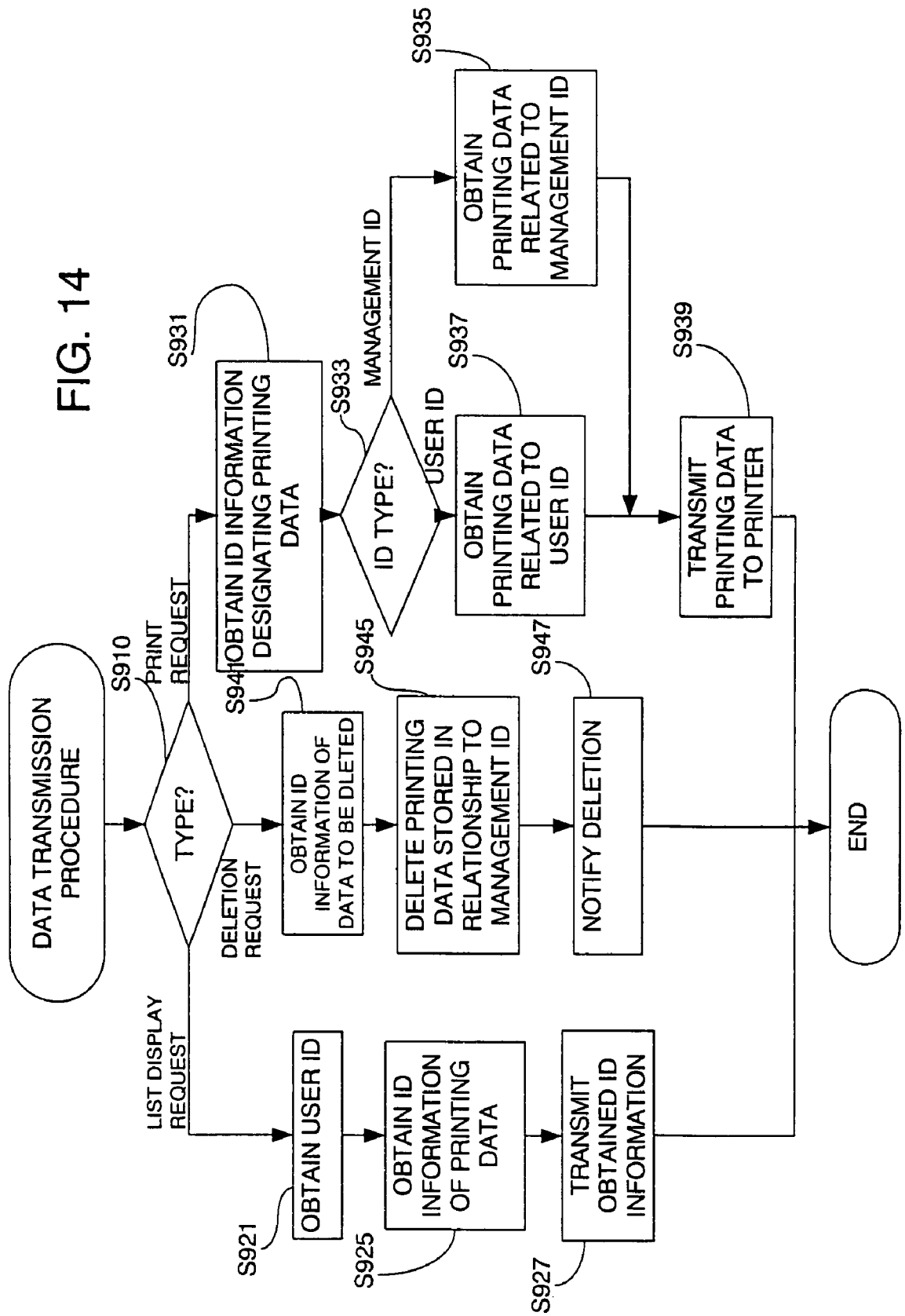
FIG. 14 is a flowchart illustrating a DATA TRANSMISSION PROCEDURE executed by the server.

The server 100 executes a DATA TRANSMISSION PROCEDURE shown in FIG. 14 when it receives a packet including the request data described above, and transmits data in response to the received request.

FIG. 14 is a flowchart illustrating the DATA TRANSMISSION PROCEDURE executed by the CPU 101 of the server 100.

When the server 100 receives a packet in S910, it judges the kind of the requests contained in the received packet (signal).

If the received signal represents a request for displaying a list of the registered printing data, the CPU 101 extracts the user ID contained in the received packet (S921), and searches for the printing data stored in relationship to a recipient ID identical to the extracted user ID in the data base 105*a*, and retrieves the ID information (sender ID, recipient ID, job ID and management ID) related to the printing data corresponding to the recipient ID (S925). Then, in S927, a list of the thus obtained ID information of the printing data is transmitted back to the printer 10M that transmitted the request, and the procedure of FIG. 13 is terminated.

If the received signal represents the request for printing, the CPU 101 obtains the ID information, which is contained in the received signal, identifying the printing data subject to be printed (S931), and judges whether the ID information represents the user ID or the management ID (S933).

If the CPU 101 judges that the ID information represents the management ID, control proceeds to S735, where the printing data stored in the data base 105*a* in relationship to the management ID is retrieved, and is printed to the printer 10M from which the request was transmitted (S939). If it is judged that the ID information represents the user ID, control proceeds to S937, where all the pieces of the printing data which are stored in the data base 105*a* in relationship to a recipient ID identical to the user ID, which data is transmitted to the printer 10M from which the request was transmitted (S939). After the transmission of the printing data in S939, the procedure of FIG. 14 is terminated.

If it is judged that the received signal represents the request for deletion, control proceeds to S941, where the CPU 101 obtains the management ID of the printing data, and deletes the printing data stored in the data base 105*a* in relationship to the management ID. Further, in S947, the CPU 101 notifies completion of the deletion of the data to the printer 10M from which the deletion request was transmitted.

Figure 15:
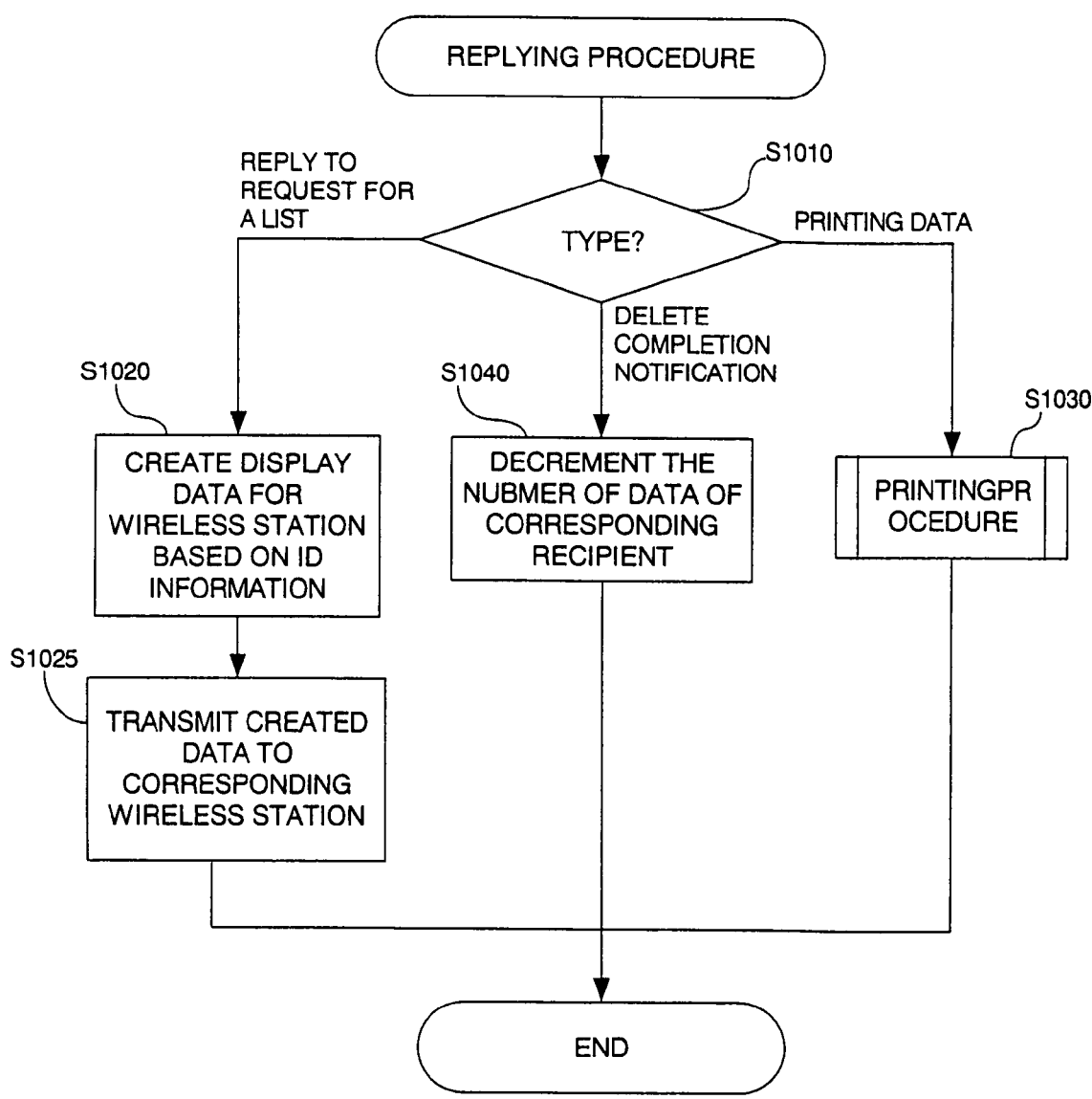
FIG. 15 is a flowchart illustrating a REPLYING PROCEDURE executed by the printer.

When the printer 10M receives a signal which has been transmitted from the server 100 in response to the signal transmitted in the RECEPTION/TRANSMISSION PROCEDURE (FIG. 13), in S610 of FIG. 10, it is judged that the received signal is not the registration notification (S610: NO), and the REPLYING PROCEDURE shown in FIG. 15 is called in S665 of FIG. 10.

In S1010, the type of the received signal is judged. If it is judged that the received signal represents replying data which is transmitted in response to the request for display of a list, control proceeds to S1020, where the list of the ID information of the printing data contained in the replying data is converted into a signal suitable for display on the display unit 51 of the wireless station 50, and the converted signal (i.e., the data for display) is transmitted to the wireless station 50 (S1025). After transmitting the data to the wireless station 50 in S1025, the procedure shown in FIG. 15 is terminated.

When the wireless station 50 receives the data for displaying the list, it is displayed on the display unit 51 of the wireless station (FIG. 11, S670 and S690).

When the printer 10M receives the printing data from the server 100, control proceeds from S1010 to S1030, where the printing procedure is performed. In the printing procedure, the components of the printer 10M are controlled and an image is formed on a recording sheet in accordance with the received printing data, and the recording sheet is discharged from the printer 10M.

When the printer 10M receives the notification of deletion of printing data, control proceeds from S1010 to S1040, where the number of the pieces of the registered data for the recipient corresponding to the user ID of the deleted data is decremented by one, and then the procedure shown in FIG. 15 is terminated.

As described above, with the data management system 2000 according to the third embodiment, in accordance with the request transmitted by the wireless station 50, designated printing data is printed by the printer 10M located close to the wireless station 50.

With this configuration, it becomes unnecessary for the user to execute detailed setting on the workstation 40. By registering the recipient ID and the printing data with the server 100, when the user input the printing request through the wireless station 50 and sends the same to the printer 10M, the printer 10M close to the recipient prints out the printing data.

In particular, according to the data management system 2000 described above, the printer 10M is configured not to print the printing data until the request for printing input. In other words, printing of the printing data can be performed at a desired timing. Therefore, when data having a relatively higher confidentiality is to be printed, it is ensured that the printout can be received by the designated recipient. Accordingly, such confidential printouts may not be stolen or taken out by a person other than the targeted recipient.

Optionally, the CPU 101 of the printer 10M is configured such that signals similar to those transmitted from the wireless station (e.g., the request for notification of the number of the registered data, request for display of a list, print request, deletion request) may be obtained through the operation of the operation unit 114. That is, when the user operates the operation unit 114, the RECEPTION/TRANSMISSION PROCEDURE shown in FIG. 13 is performed, and procedure corresponding to the operation of the operation unit 114 is performed. Therefore, the user can input request signals, which are input by operating the wireless station 50, can also be input to the printer 10M by operating the operation unit 114.

According to the data management system 2000, the server 100 automatically selects the printing data for the recipient ID from the data base 105a in accordance with the user ID corresponding to the print request, and transmits the printing data to the printer 10M located close to the user to output the same. Therefore, the user need not manually select the data addressed to him/her by operating the operation unit 52. Only by operating to send the print request, the printing data addressed to the user of the wireless station 50 is printed with the printer 10M close to the user.

The data management system 2000 is configured to transmits the number of registered printing data to the wireless stations 50 at predetermined intervals. Therefore, the users can easily recognize the number of data directed to them. In other words, in the data management system 2000 is capable of letting the users to recognize that the printing data is registered with the data base 105a at every predetermined interval.

Further, according to the data management system 2000, a list of the ID information of the registered printing data can be displayed on the display units 51 of the wireless stations 50. Thus, the users can recognize the detailed information of the printing data registered with the data base 105a.

That is, according to the data management system 2000, each user can check the printing data registered with the data base 105a with the ID information list for himself/herself displayed on the display unit 51 of the wireless station even when a plurality of pieces of printing data are registered with the data base 105a.

In the above-described third embodiment, the list is displayed on the display unit 51 of the wireless station 50. It can be modified such that the ID information list is displayed on the display unit 126 of the printer 10M when the request for the list is input through the operation unit 114 of the printer 10M.

According to the data management system 2000, the user selects the printing data to be printed from among the plurality of pieces of printing data indicated in the list. Therefore, the user can initiates the print job for each printing data at a desired timing.

According to the data management system 2000, the printing data is not deleted automatically from the data base 105a even after the printing data is printed. Therefore, if a piece of the printing data is once registered with the data base 105a, the user can print the same a plurality of times until the user intentionally delete the printing data. Of course, the invention need not be limited to such a configuration, and may be modified to automatically delete the printing data after it is printed.

Each of the database management system, database server and image forming device (printer) is not limited to that described above, and various modification may be applied without departing from the gist of the invention.

For example, in the above-describe embodiment, when a piece of the printing data is deleted from the database 105a, the piece of the data to be deleted is designated with its management ID, and the request for deletion is transmitted to the server 100. This configuration may be modified such that the printing data to be deleted is identified with the user ID, and the server 100 deletes, from the database 105a, all the pieces of the printing data which are stored in relationship to the recipient ID identical to the designated user ID.

With such a configuration, the user can delete a plurality of pieces of printing data simultaneously. Therefore, for example, the user can delete all the data addressed to him/her from the database 105a at a time.

If the system 2000 is configured such that the printing data to be deleted is designated with the user ID and the management ID, advantages of designating the data with the user ID and with the management ID can be obtained.

In the third embodiment, the wireless station 50 may be a note type personal computer or a cell phone. Alternatively, the wireless station 50 may be a dedicated device having a function of sending the user ID, the request signals and the like.

Alternatively, the wireless station may be a transmitter which periodically transmits the user ID. Further alternatively, the wireless station may be an IC card or the like which receives the electromagnetic wave with an antenna having a loop coil and generates a modified wave based on the user ID and transmits the same.

In the above-described third embodiment, the user ID is obtained with the wireless communication using the wireless communication unit 118 of the printer 10M. It can be modified such that a plurality of user ID receiving device including wireless communication units within the network, separately from the printers 10M or in addition to the communication unit 118 of the printers 10M, and that information related to the detected user ID is transmitted to the server 100. In this case, by configuring the server 100 such that the target printer 10M is determined based on the network address of the user ID receiving device, the printing data is printed by the printer close to the user.

In the above-described embodiment, as an example of registering the printing data with the database 105a of the server 100, a plurality of workstations 40 connected with the network 3 are described. The system may be modified such that the printing data includes data transmitted from facsimile devices. In this case, for example, the server 100 is configured to be connected with a public telephone line, and image data and a recipient ID are received from the facsimile device and registered.

Fourth Embodiment

Figure 16:
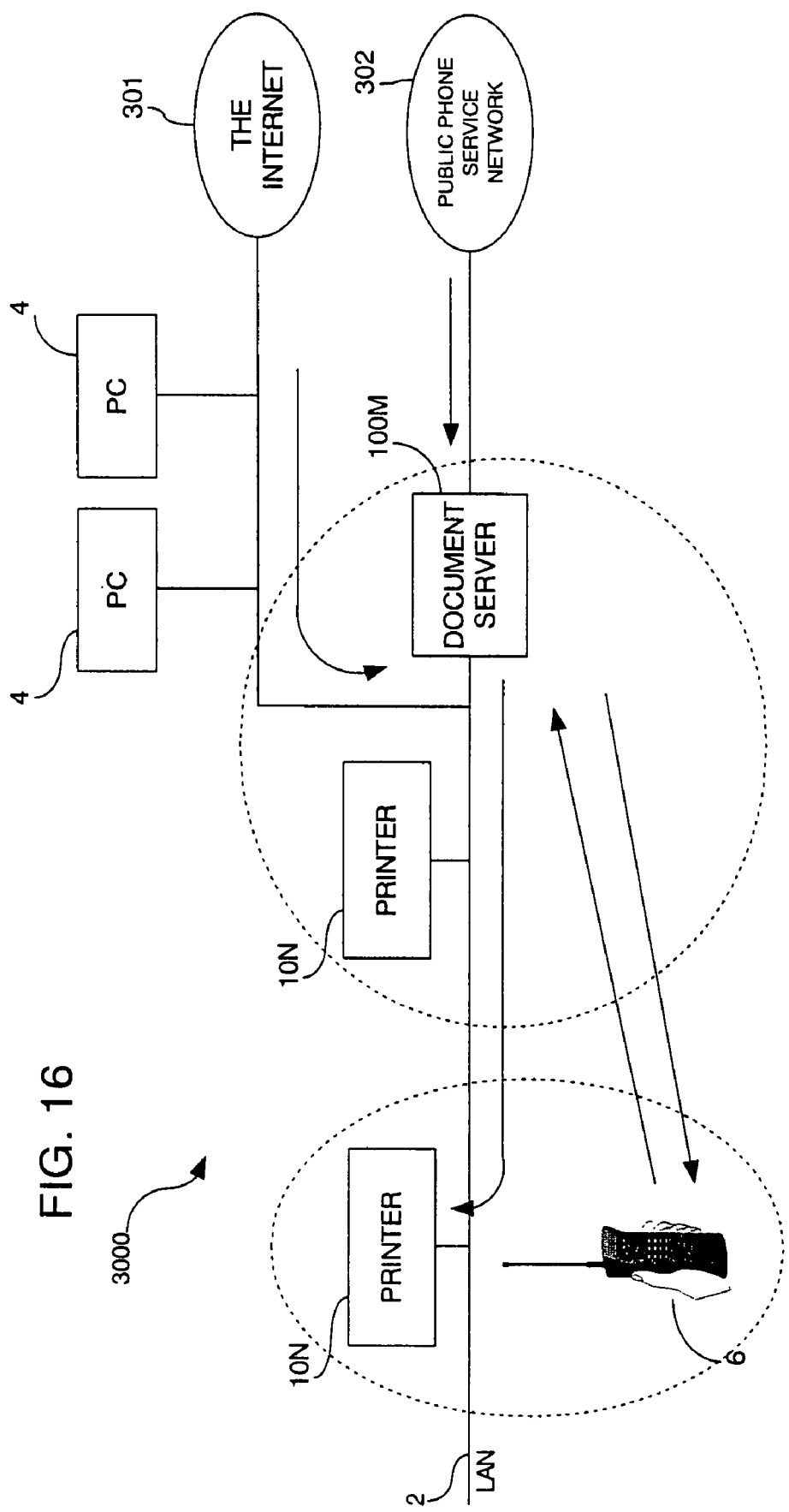
FIG. 16 is a block diagram showing a configuration of a data management system according to a fourth embodiment.

FIG. 16 is a block diagram showing a configuration of a data management system 3000 according to a fourth embodiment.

The data management system 3000 shown in FIG. 16 is for managing image data, i.e., printing data and facsimile data, to be printed with printers 10N connected to a LAN 2. The data management system also includes a document server 100M and cell phones 6.

In the data management system, the document server 100M is connected with a plurality of printers 10N and personal computers (PC) 4 through the LAN 2. The server 100M is also connected with the Internet 301 through the LAN 2, and with the public telephone service network 302.

Each of the server 100N, the cell phones 6 and the printers 10N is capable of performing data communication in accordance with the Bluetooth communication method of class 1.

Figure 17:
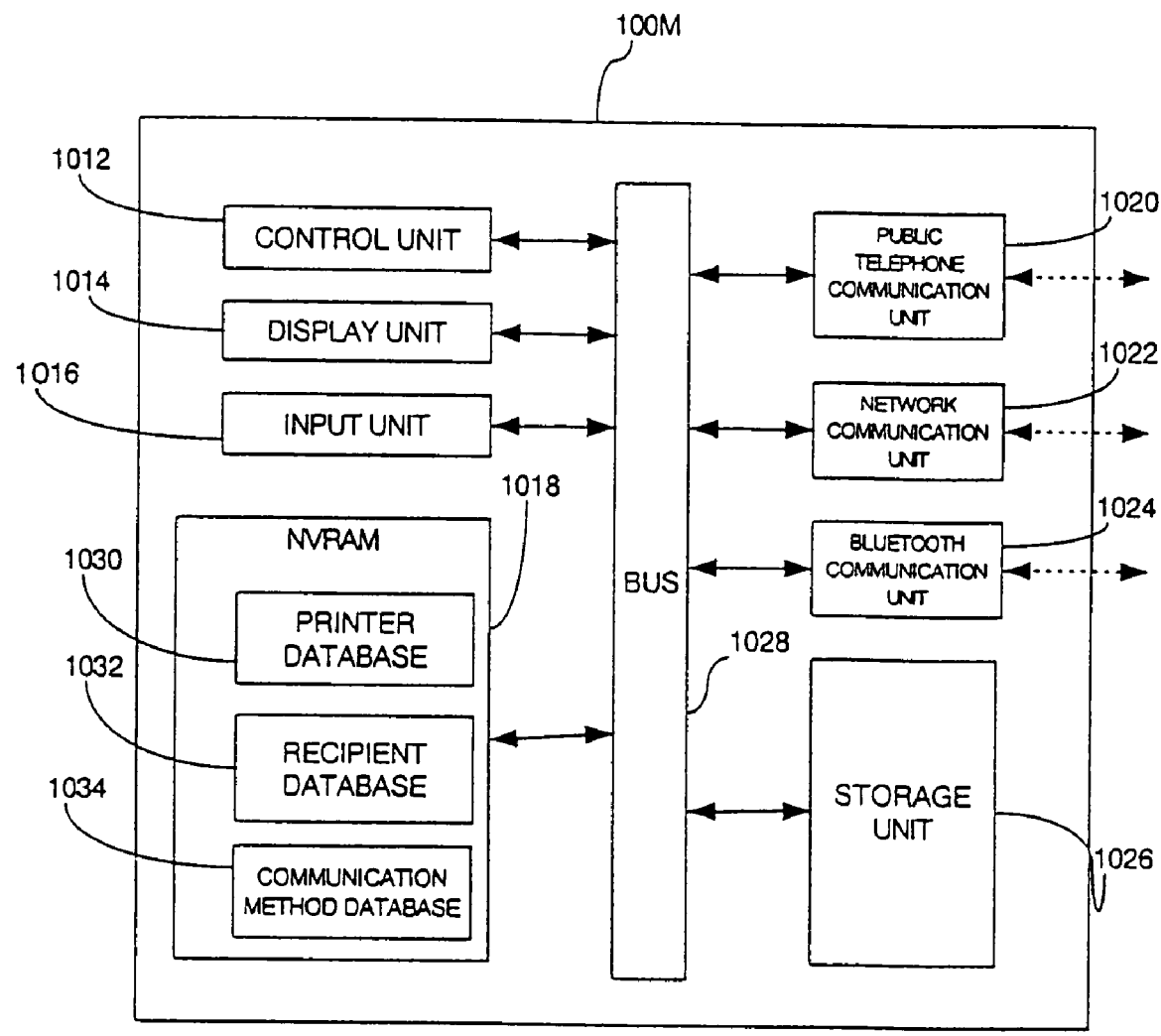
FIG. 17 is a block diagram showing a configuration of a document server according to a fourth embodiment.

FIG. 17 is a block diagram showing a configuration of the document server 100N.

As shown in FIG. 17, the document server 100M includes a control unit 1012, a display unit 1014 which displays information on a display device (not shown), an input unit 1016 through which a user can input operation commands or the like through a keyboard (not shown) thereof, an NVRAM (Non-volatile RAM) 1018, a public telephone network communication unit 1020 which exchanges data through the public telephone service network 302, a network communication unit 1022 which exchanges data through the LAN 2, a Bluetooth communication unit 1024 which exchanges data in accordance with the Bluetooth communication method, a data storage unit 1026 which stores received printing data and/or facsimile data on a storage medium such as a hard disk drive or the like (not shown), and a bus 1028 connecting the above-described components of the document server 100M.

The NVRAM 1018 includes a printer database 1030, a recipient database 1032 and a communication method database 1034. The data stored in these databases are input through the input unit 1016.

Figure 18:
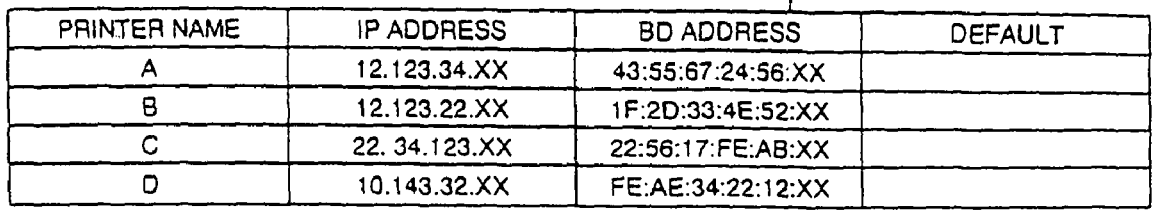
FIG. 18 is a chart illustrating a printer database.

FIG. 18 is a chart illustrating data stored in the printer database 1030. The printer database 1030 stores data for each printer 10N connected with the document server 100M through the LAN 2. Specifically, as shown in FIG. 18, for each printer 10N, a name of the printer, an IP address (Internet Protocol address) and a BD address are stored. Further, one of the stored printers 10N is designated as a default printer, which is referred to in a procedure described later. In the example shown in FIG. 18, the default printer 10N is indicated by asterisk "*" in the "default device" column. In the following description, the printer 10N designated as the default device will be referred to as a default printer 10N.

Figure 19:
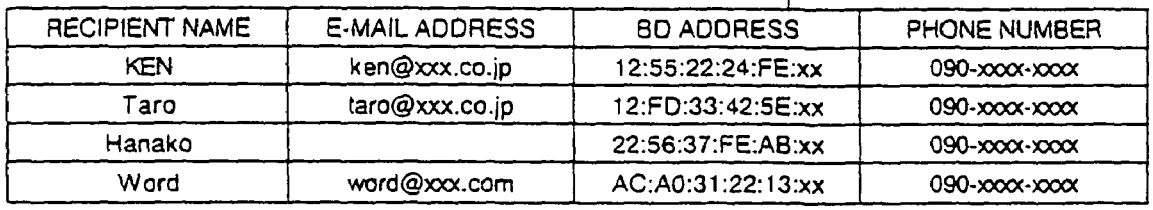
FIG. 19 is a chart illustrating a recipient database.

FIG. 19 is a chart illustrating a recipient database 1032. The recipient database 1032 stores information of recipients who are supposed to use the data management system shown in FIG. 16 and receive printouts of the printers 10N. Specifically, as information for each recipient, a name of the recipient, an e-mail address as information regarding a target communication device (i.e., a cell phone 6) the recipient has, a BD address and the phone number of the cell phone 10N.

Figure 20:
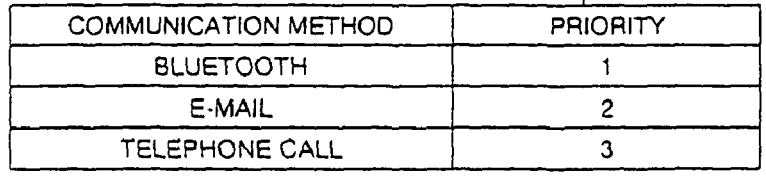
FIG. 20 is a chart illustrating a communication method database.

FIG. 20 is a chart illustrating a communication method database 1034. The communication method database 1034 stores information regarding a priority with respect to communication methods to be used for communicating from the document server 100M to the cell phone 6. In this example, three communication methods (i.e., Bluetooth, e-mail and phone call) and priority thereof are stored.

Figure 21:
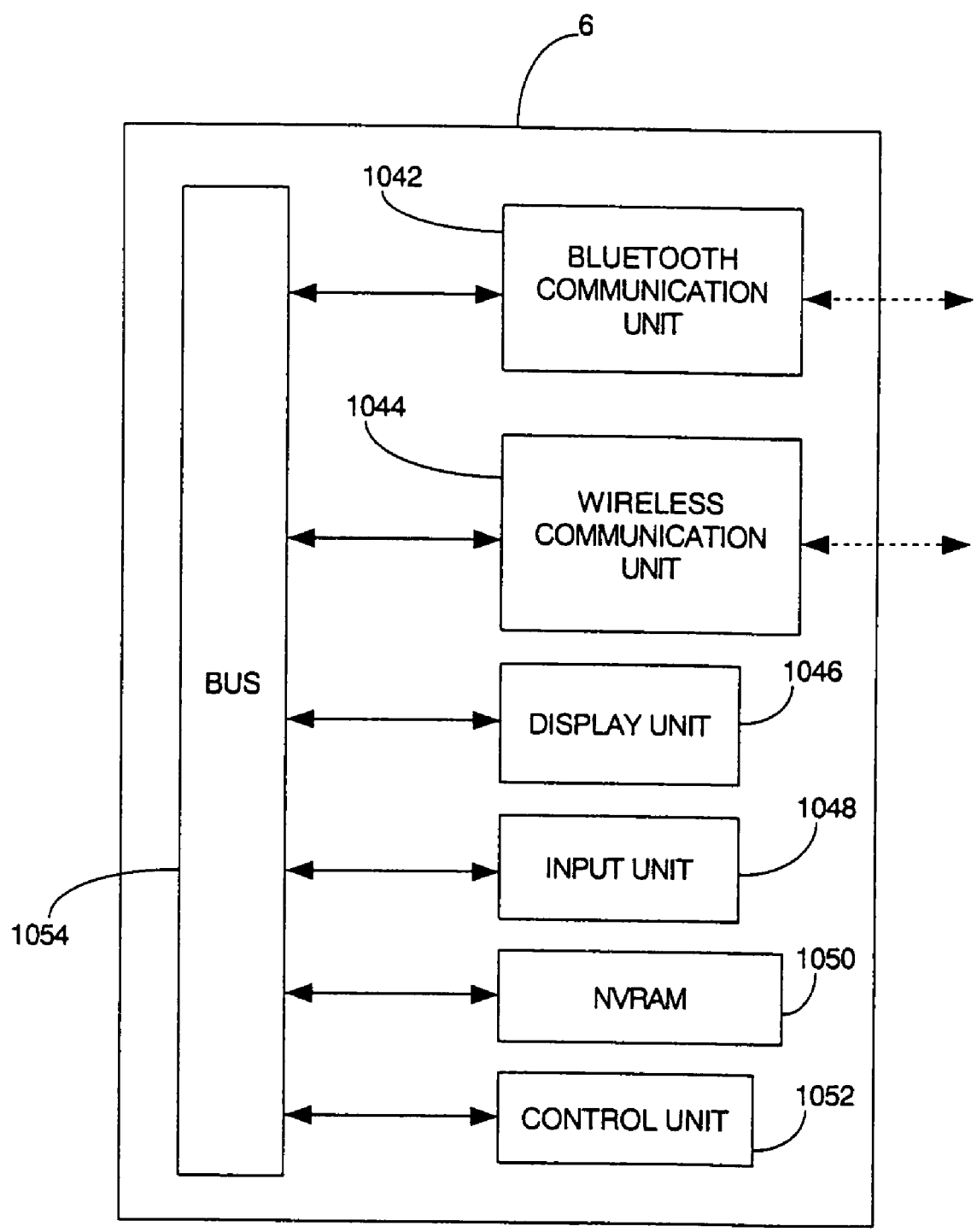
FIG. 21 is a block diagram showing a configuration of a cell phone according to the fourth embodiment.

FIG. 21 is a block diagram showing a configuration of the cell phone 6 according to the fourth embodiment. According to the fourth embodiment, each recipient has a cell phone 6, which includes a Bluetooth communication unit 1042 which exchanges data in accordance with the Bluetooth communication method, a wireless communication unit 1044 which transmits/receives data through the Internet 301 and/or public telephone service network 302 by a wireless communication with a closest base station, a display unit 1046 which displays information on a display device (not shown) thereof, an input unit 1048 through which a user input various command through a keyboard (not shown) thereof, an NVRAM 1050, a control unit 1052 for performing various controls and a bus 54 that connects the above-described components of the cell phone 6.

The printer 10N is a general use printer which printouts an image represented by the printing data and/or facsimile data received form outside.

Figure 22:
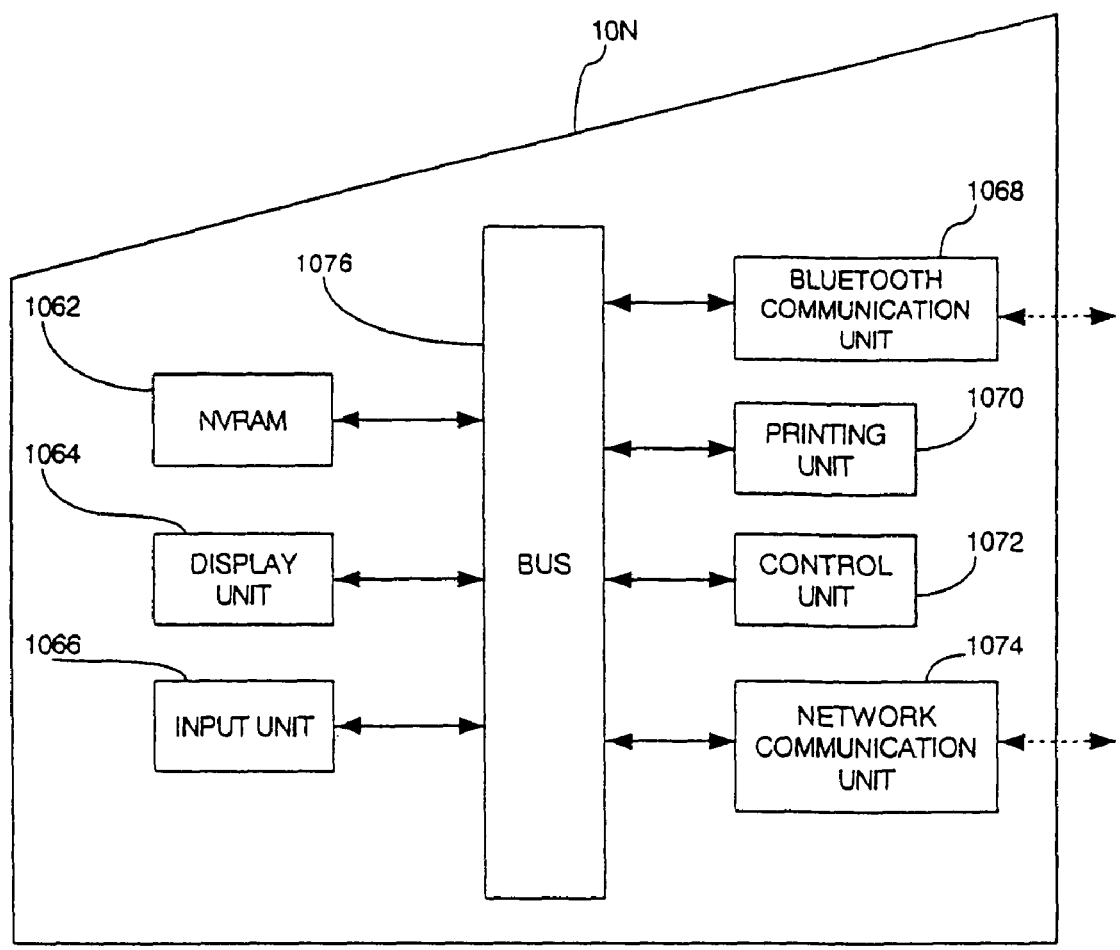
FIG. 22 is a block diagram showing a printer according to the fourth embodiment.

FIG. 22 is a block diagram showing a configuration of the printer 10N according to the fourth embodiment. The printer 10N includes an NVRAM 1062, a display unit 1064 that displays information on a display device (not shown) thereof, an input unit 1066 through which a user input various commands with a keyboard (not shown) thereof, a Bluetooth communication unit 1068 which transmits/receives data in accordance with the Bluetooth communication method, a printing unit 1070 that printouts the image represented by the received printing data and the facsimile data, a control unit 1072 for performing various controls, a network communication unit 1074 which transmits/receives data through the LAN 2 and a bus 76 for connecting the above-described components of the printer 10N.

In each of the personal computers 4, a printer driver for the data management system according the fourth embodiment is installed. When a print job is performed, as optional settings, a target document server 100M can be designated, and a name or the like of the recipient of the output of the print job can be input. When the printing data is transmitted, the personal computer 4 transmits, to the designated document server 100M, the printing data together with the input name of the recipient, through the LAN 2.

When the document server 100M receives the printing data which is transmitted by a personal computer 4 through the LAN 2, or facsimile data through the public telephone service network 302 or the Internet 301, the received data (i.e., the printing data or the facsimile data) is once stored in the stored, and transmits a notification of receipt of such data to the recipient of the received data to the cell phone 6 of the recipient. Thereafter, when the document server 100M receives a command designating the printer 10N to be used for printing the received data, the document server 100M transmits the received data to the designated printer 10N.

Next, a procedure for transmitting data which is executed by the control unit 1012 will be described with reference to FIG. 23.

Figure 23:
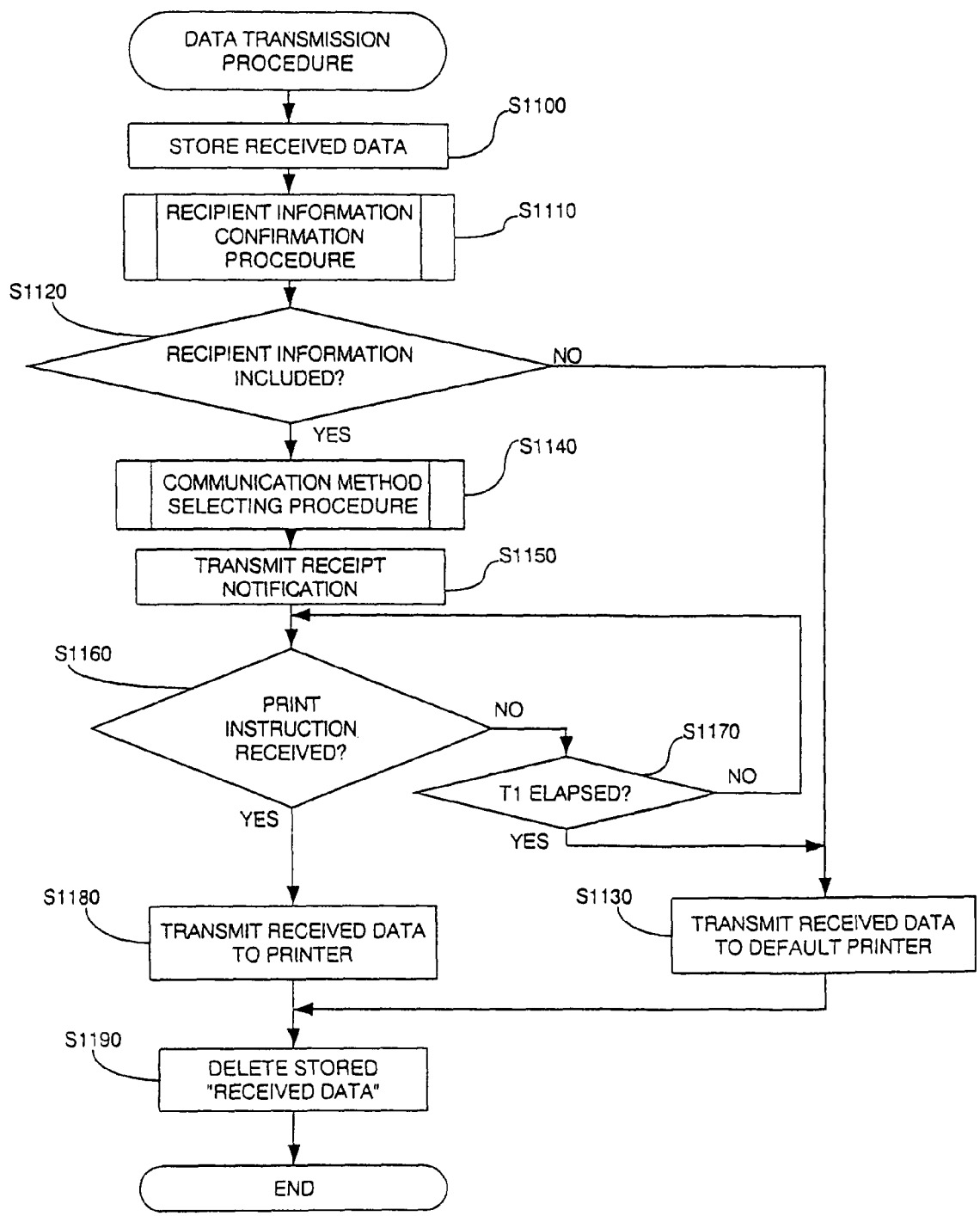
FIG. 23 is a flowchart illustrating a DATA TRANSMISSION PROCEDURE according to the fourth embodiment.

FIG. 23 is a flowchart illustrating a DATA TRANSMISSION PROCEDURE executed by the control unit 1012. The procedure shown in FIG. 23 is initiated when the document server 100M receives data through the network communication unit 1022 or the public phone communication unit 1020.

In S1100, the received data is stored in the storage unit 1026. Then, in S1110, a RECIPIENT INFORMATION CONFIRMATION PROCEDURE is executed to check/confirm whether the received data includes information regarding the recipient of the data.

If the information regarding the recipient is not included in the received data (S1120: NO), control proceeds to S1130, where the network communication unit 1022 is controlled to transmit the received data which has been stored in the storage unit 1026 to the default printer 10M through the LAN 2. When the received data is transmitted to the default printer 10M, the IP address stored in the printer database 1030 is referred to.

IF the information regarding the recipient is included in the received data (S1120: YES), control proceeds to S1140. In S1140, a COMMUNICTION METHOD SELECTIING PROCEDURE is performed to select a communication method used for transmitting the receipt notification to the cell phone 6 of the recipient. In the following description, the recipient will be referred to as recipient A. The procedure at S1140 will be described later.

After the communication method is determined in S1140, control proceeds to S1150, in which the communication unit corresponding to the determined communication method is controlled to transmits the receipt notification (i.e., the notification informing the recipient A of the receipt of printing data or facsimile data) to the cell phone 6 of the recipient.

In S1160, it is judged whether a print instruction is received from the recipient A (i.e., the cell phone 6 of the recipient A). It should be noted that the print instruction is transmitted in accordance with one of the Bluetooth communication method, e-mail or telephone call.

It should be noted that whether the received print instruction is transmitted from the cell phone 6 of the recipient A is judged as follows.

(1) If the print instruction is transmitted in accordance with the Bluetooth method, the instruction includes the BD address of the cell phone 6 of the sender. Therefore, by comparing the BD address included in the received print instruction with data of the recipient database, whether the received BD address is from the cell phone 6 of the recipient A can be judged.

(2) If the print instruction is transmitted by e-mail through the Internet 301, the instruction includes the e-mail address of the cell phone 6 of the sender. Therefore, similarly to the above case, by referring to the recipient database, whether the print instruction is transmitted by the recipient A can be judged.

(3) If the print instruction is transmitted by a telephone through the public telephone service network 302, the instruction includes the telephone number of the cell phone 6 of the sender. Therefore, based on the telephone number of the sender, whether the print instruction is transmitted from the recipient A can be judged.

In the above configuration, the judgment is done based on the communication information intrinsic to the cell phone 6. However, the configuration need not be limited to this example. For example, if the document server 100M transmits the receipt notification including some identifiable information, and the cell phone 6 which received the receipt information send the print instruction which also includes the identifiable information, the document server 100M is capable of judging whether the print instruction is transmitted from the cell phone 6 of the recipient A.

If it is judged that the printing instruction is not received from the cell phone 6 of the recipient (S1160: NO), control proceeds to S1170, where it is judged whether a predetermined time period T1 has passed since the receipt notice was transmitted to the cell phone 6. If it is judged that the time period T1 has not yet elapsed (S1170: NO), control returns to S1160. If it is judged that the time period T1 has elapsed (S1170: YES), control proceeds to S1130, where the network communication unit 1022 is controlled to transmit the received data which has been stored in the storage unit 1026 to the default printer 10N through the LAN 2.

If it is judged that the print instruction from the cell phone 6 of the recipient A is received (S1160: YES), control proceeds to S1180, where the network communication unit 1022 is controlled to transmit the received data which has been stored in the storage unit 1026 to the printer 10N that is determined based on the print instruction. It should be noted that the print instruction contains the BD address of the printer 10N which is detected by the cell phone 6 of the recipient A. Based on the BD address of the printer 10N, the IP address thereof is detected from the printer database 1030, which is used as the target address of the printer 10N to which the received data (i.e., the printing data or the facsimile data) is transmitted.

It should be noted that, if the printer 10N to which the received data is transmitted is the printer 10N within a Piconet area (within a circle centered on the cell phone 6 whose radius is 10 m in the fourth embodiment) of the document server 100M, the received data may be transmitted through the Bluetooth communication unit 1024. In this case, the BD address of the printer 10N included in the received print instruction can be used as the communication information for transmitting the received data as it is, and therefore, it is unnecessary to refer to the printer database 1030.

After transmitting the received data to the printer 10N in step S1130 or S1180, control proceeds to S1190. In S1190, the data storage unit 1026 is controlled to delete the printing data which has been transmitted to the printer 10N, and the procedure shown in FIG. 23 is terminated.

According to the fourth embodiment, when the received data does not contain the recipient information, or when the recipient information is contained but the print instruction is not received within a predetermined period T1, the received data is transmitted to the default printer 10N. If the received data includes the recipient information and the print instruction is received within the predetermined period T1, the received data is transmitted to the printer 10N in accordance with the print instruction.

Figure 24:
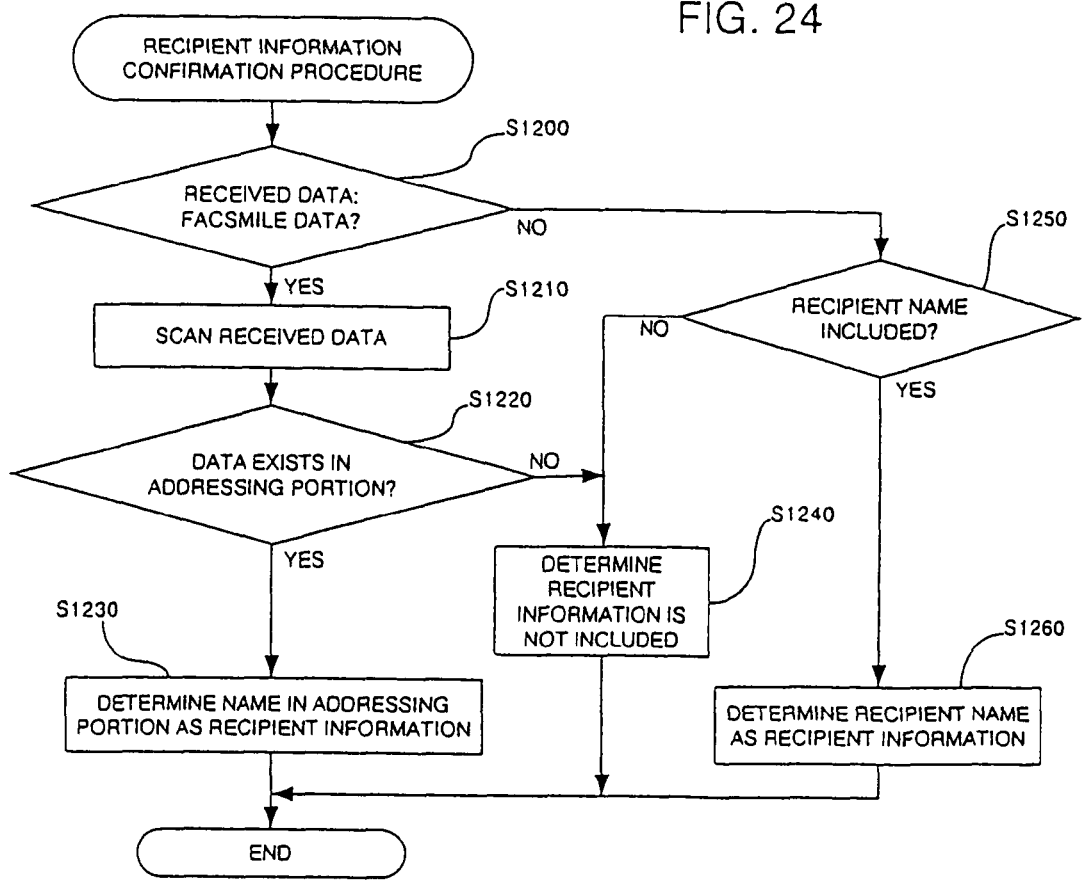
FIG. 24 is a flowchart illustrating a RECIPIENT INFORMATION CONFIRMATION PROCEDURE.

FIG. 24 is a flowchart illustrating a RECIPIENT INFORMATION CONFIRMATION PROCEDURE which is executed by the control unit 1012 of the document server 100M. It should be noted that the procedure is called in S1110 in the flowchart shown in FIG. 23.

When the RECIPIENT INFORMATION CONFIRMATION PROCEDURE is initiated, in S1200, it is judged whether the received data is the facsimile data. The type of the received data is judged based on which unit has received the signal, and a format of the received data. That is, if the data is received through the public telephone service network 1020, it is judged that the received data is the facsimile data. If the data is received through the network communication unit 1022, the received data may be the printing data from the personal computer 4 or the facsimile data from an Internet facsimile. Based on the protocol used (and the data format, if necessary), the type of the received data is finally judged.

If it is judged that the received data is the facsimile data (S1200: YES), control proceeds to S1210, where the received data is scanned and its addressing portion (e.g., an upper left portion of a first page of the image represented by the data) is referred to. Then, in S1220, it is judged whether the addressing portion of the image represented by the received data includes a name.

If the name is included in the addressing portion (S1220: YES), control proceeds to S1230. In S1230, the name in the addressing portion is regarded as the recipient information representing the recipient name and the procedure shown in FIG. 24 is terminated.

If the name is not included in the addressing portion (S1220: NO), control proceeds to S1240, where it is determined that the received data does not include the recipient information, and the procedure is terminated.

If it is judged that the received data is not the facsimile data (i.e., the received data is the printing data) (S1250: NO), control proceeds S1240, where it is determined that the received data does not include the recipient information, and the procedure is terminated.

If it is judged that the recipient name is included (S1250: YES), control proceeds to S1260, where the recipient data is determined to be the recipient information, and the procedure of FIG. 24 is terminated.

Figure 25:
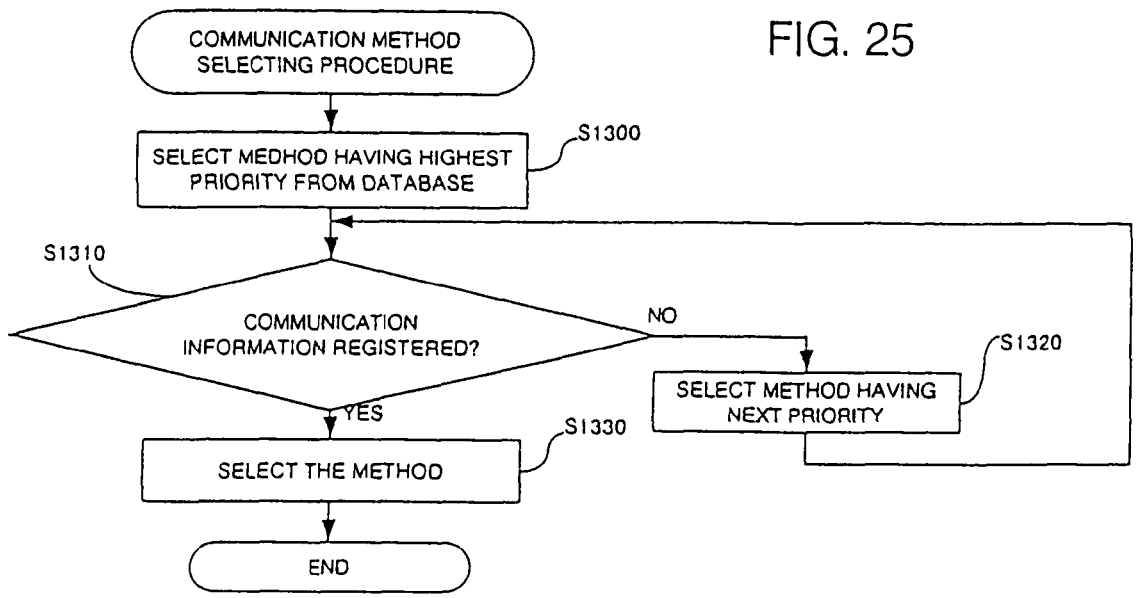
FIG. 25 is a flowchart illustrating a COMMUNICATION METHOD SELECTING PROCEDURE.

FIG. 25 is a flowchart illustrating a COMMUNICATION METHOD SELECTING PROCEDURE executed by the control unit 1012 of the document server 100M. The procedure is called in S1140 of the DATA TRANSMISSION PROCEDURE shown in FIG. 23.

In S1300, with reference to the communication method database 1034, the communication method having the highest priority (the Bluetooth method in this example) is selected. Then, control proceeds to S1310, where, with reference to the recipient database 1032, it is judged whether the communication information employing the selected communication method is registered for the recipient A represented by the recipient information included in the received data. It should be noted that, in S1310, even if the BD address is registered with the recipient database 1032, if the cell phone having the BD address is not located within the communicable area (i.e., in the Piconet area of the document server 100M), it is regarded that the BD address is not registered.

If it is judged that the communication information is not registered (S1310: NO), control proceeds to S1320, where a communication method having the next priority is selected with reference to the communication method database 1034, and control returns to S1310.

If it is judged that communication information is registered (S1310: YES), control proceeds to S1330, where the selected communication method is determined as the communication method to be used, and the procedure shown in FIG. 25 is terminated.

According to the procedure shown in FIG. 25, from among the possible communication methods usable with respect to the cell phone 6 of the recipient A, one having the highest priority is selected. In this example, the priority is determined based on the communication cost.

Figure 26:
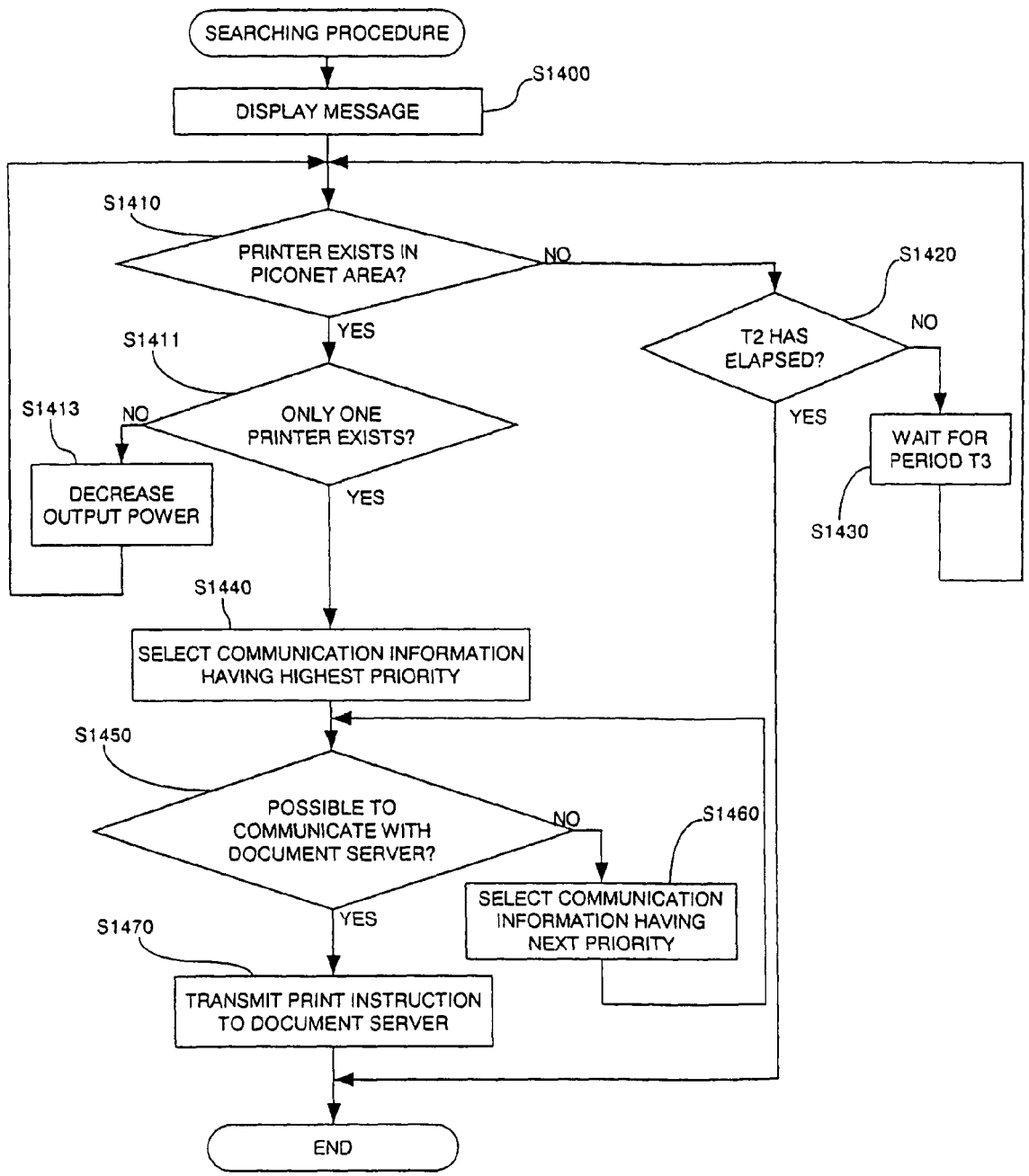
FIG. 26 is a flowchart illustrating a SEARCHING PROCEDURE.

FIG. 26 is a flowchart illustrating a SEARCHING PROCEDURE executed by the control unit 1052 of the cell phone 6. The procedure shown in FIG. 26 is initiated automatically when the receipt notification from the document server 100M is received by the Bluetooth communication unit 1042 or the wireless communication unit 1044. It should be noted that, when the notification is transmitted by e-mail, the procedure shown in FIG. 26 is initiated when an command for opening the received e-mail is input through the operation key of the input unit 1048.

When the SEARCHING PROCEDURE is initiated, in S1400, a message indicating that the received data is transmitted to the document server 100M is displayed on the display unit 1046. In S1410, it is judged whether a printer 10N is located within the Piconet area of the cell phone 6. That is, a printer 10N is searched within the Piconet area.

Specifically, a request signal requesting a Bluetooth device within the Piconet area for reply is transmitted by the Bluetooth communication unit 1042, and it is judged whether a reply signal replaying to the request signal is received by the Bluetooth communication unit 1042. If a Bluetooth device other than the cell phone 6 is located within the Piconet area, the Bluetooth communication unit 1042 receives the reply from the device. However, the Bluetooth communication unit 1042 has a function of asking a type of the communicating device as a standard function, and with use of this function, whether the reply is transmitted from the printer 10N or not can be judged. When the reply signal is received, the BD address of the sender of the reply signal is also obtained.

If it is judged that there is no printer 10N within the Piconet area (S1410: NO), control proceeds to S1420, where it is judged whether a predetermined period T2 has passed since search of the printer 10N was started.

If it is judged that the predetermined period T2 has elapsed (S1420: YES), the procedure shown in FIG. 26 is terminated.

If it is judged that the predetermined period T2 has not elapsed (S1420: NO), control pauses for a period T2 in S1430 and then returns to S1410 to search the printer 10N again. The pause in S1430 is provided to lower power consumption for searching the printer 10N.

If it is judged that the printer(s) 10N is located within the Piconet area (S1410: YES), control proceeds to S1411. In S1411, it is judged whether only one printer is located within the Piconet area. It should be noted that a plurality of printers may be found within the Piconet area. In such a case, it is preferable that the printer closest to the cell phone 6 is used. According to the embodiment, if it is judged that more than one printers 10N are found within the Piconet area (S1411: NO), the Piconet area is reduced by lowering transmission power (S1413). The steps S1410 through S1413 are repeated until only one printer is located within the Piconet area. With this configuration, the printer closest to the cell phone 6 can be detected and used.

After the number of the printers 10N is reduced to one (S1411: YES), control proceeds to S1440. It should be noted that, if no printers 10N are found as a result of reducing of the Piconet area, the Piconet area may be expanded again so that one or more printers 10N are located within the Piconet area. For the sake of simplicity, such procedure is not included in FIG. 26.

In S1440, communication information having the highest priority is selected from among communication information with respect to the document server 100M. It should be noted that, in the NVRAM 1050 of the cell phone 6, BD address, e-mail address and telephone number are preliminarily stored as the communication information, with the priority in this order, from high to low.

In S1450, it is judged whether it is possible to communicate with the document server 100M in accordance with the selected communication information.

If it is impossible to communicate with the document server (S1450: NO), control proceeds to S460, and the communication information having the next priority is selected. Then, control proceeds to S1450.

If it is possible to communicate with the document server 100M (S1450: YES), control proceeds to S1470, where the communication unit corresponding to the selected communication information to transmit the print instruction including the BD address of the printer 10N which is detected to be located in the Piconet area of the cell phone 6. After the print instruction is transmitted to the document server 100M, the procedure shown in FIG. 26 is terminated.

Hereinafter, an operation of the data management system according to the fourth embodiment will be described. For an explanation purpose, it is assumed that the document server 100M and a plurality of printers 10N are located on the same floor (which will be referred to as a first floor hereinafter) of a building, and a plurality of personal computers 4 are located on a floor (which will be referred to as a second floor hereinafter) which is different from the first floor.

First Exemplary Operation

In a first example, the printing data is transmitted from a personal computer on the second floor to Taro working on the first floor.

In this case, the user of the personal computer 4 on the second floor sets, in the printing option setting window, the document server 100M as the designated device of the printing data, and inputs the name "Taro" as a recipient of the transmitted printing data. Thereafter, when an operation for transmitting the data is performed, the printing data on the personal computer 4 is transmitted to the document server 100M through the LAN 2.

When the document server 100M receives the printing data from the personal computer 4, it stores the received printing data and checks whether a recipient is included in the received data (see S1100-S1120 of FIG. 23). It should be noted that, if the recipient name was not input during the printing option setting procedure on the personal computer, the printing data transmitted to the personal computer 4 to the document server 100M is transmitted to the default printer 10N through the LAN 2. Then, the printing data stored in the document server 100M is deleted (S190 of FIG. 23).

Next, the document server 100M selects a communication method to be used for transmitting the receipt notification to the cell phone 6 of a user identical to the recipient (i.e., Taro) included in the printing data based on the priority stored in the communication method database 1034 and the communication information (i.e., communication information with respect to the cell phone 6 Taro has) stored in the recipient database 1032.

For explanation purpose, it is assumed that, Taro is working at a location remote from the document server 100M, and therefore the document server 100M and the cell phone 6 Taro has cannot communicate in accordance with the Bluetooth method. In such a case, the document server 100M selects a communication method having the next high priority, which is e-mail.

Accordingly, the document server 100M transmits the receipt notification to the cell phone 6 Taro has by e-mail.

When the cell phone 6 of Taro receives the receipt notification by e-mail, it notifies the receipt of the same to Taro by sound and/or vibration. Then, when Taro operates to open the received e-mail, step S1400 of FIG. 26 is performed, and the message indicating that the data is transmitted to the document server 10 is displayed on the display device of the cell phone 6. Further, the cell phone 6 start searching a printer 10M in the Piconet area (S1410-S1430 of FIG. 26). It is assumed, for explanation purpose, that there are no printers 10N within the Piconet area of the cell phone 6 at this stage.

When Taro approaches a printer 10N close to the current location of Taro, the cell phone 6 approaches the printer 10N. Then, the printer 10M is located inside the Piconet area of the of the cell phone 6. Then, the cell phone 6 detects the printer 10N and obtains the BD address of the printer 10N. If Taro does not go toward the printer 10N, and the printer has not been detected for more than the predetermined period T2, the cell phone 40 does not transmit the print command, and the procedure shown in FIG. 26 is terminated.

Further, the cell phone 6 selects communication information to be referred to when the print instruction is transmitted to the document server, based on the preliminarily stored priority (S1440-S1460 of FIG. 26).

It is assumed that, Taro is now at the printer 10N which is remote from the document server 100M, and the document server 100M and the cell phone 6 Taro has cannot communicate, according to the Bluetooth communication, with each other. Thus, the cell phone 6 selects, as the communication information, the e-mail address which has the next high priority, which is used as the communication information to be referred to when the print instruction is transmitted.

Then, the cell phone 6 transmits the print instruction including the BD address of the detected printer 10N to the document server by e-mail (see S1470 of FIG. 26).

When the document server 100M receives the print instruction by e-mail from the cell phone 6 (see S1160 and S1170 of FIG. 23), based on the e-mail address of the sender of the e-mail message, and the recipient database 1032, it is judged that the print instruction comes from the cell phone 6 owned by Taro.

Then, the document server 100M reads out the IP address of the printer 10M based on the BD address of the printer 10M included in the received print instruction and the printer database 1030, and using the IP address as the destination, the document server 100M transmits the printing data for Taro to the IP address through the LAN 2. With this procedure, the printer 10N located close to Taro 10 outputs the image represented by the printing data (S1180 of FIG. 23).

If a time period T1 from the transmission of the receipt notification to the print instruction exceeds the predetermined period T1, control proceeds to S1130, where the printing data addressed to Taro is transmitted to the default printer 60 through the LAN so that the image represented by the printing data is printed. Then, the document server 100M delete the printing data (S1190 of FIG. 23).

Second Exemplary Operation

In a second example, the facsimile data is transmitted from an external facsimile device to the document server 100M through the public telephone service network 8, the facsimile addressed to Hanako who is working on the first floor. It should be noted that the facsimile data from the external facsimile device is transmitted to the telephone number of the document server 100M.

When the document server 100M receives the facsimile data from the external facsimile device, it temporarily stores the received facsimile data in the storage unit 1026 (S1100 of FIG. 23). The facsimile data is scanned and the name ("Hanako") included in the addressing portion of the image represented by the facsimile data is judged as the recipient information indicating the recipient of the facsimile data (S1110-S1120). If the name is not included in the addressing portion of the image represented by the facsimile data, control proceeds to S1130 (FIG. 23), where the facsimile data directed to Hanako is transmitted to the default printer 10N through the LAN 2 to print out the same, and delete the stored facsimile data (S1190).

Next, the document server 100M selects a communication method to be used for transmitting the receipt notification to the cell phone 6 of a user identical to the recipient (i.e., Hanako) included in the facsimile data based on the priority stored in the communication method database 1034 and the communication information (i.e., communication information with respect to the cell phone 6 Hanako has) stored in the recipient database 1032.

For explanation purpose, it is assumed that, Hanako is working at a location remote from the document server 100M, and therefore the document server 100M and the cell phone 6 of Hanako cannot communicate in accordance with the Bluetooth method. It is further assumed that the cell phone 6 of Hanako does not have a function of sending an e-mail message. In such a case, the document server 100M selects a communication method having the priority next to e-mail, which is a communication by telephone.

Accordingly, the document server 100M transmits the receipt notification to the cell phone 6 of Hanako through the public telephone service network 302.

When the cell phone 6 of Hanako receives the receipt notification through the public telephone service network 302, it notifies the receipt of the same to Hanako by sound and/or vibration. After a predetermined ringing operations, the cell phone 6 answers the call from the document server 100M automatically and receives the receipt notification. Then, step S1400 of FIG. 26 is performed, and the message indicating that the data is transmitted to the document server 10 is displayed on the display device of the cell phone 6. Further, the cell phone 6 starts searching for a printer 10M in the Piconet area (S1410-S1430 of FIG. 26). It is assumed, for explanation purpose, that there are no printers 10N within the Piconet area of the cell phone 6 at this stage.

When Hanako approaches a printer 10N close to the current location of Hanako, the cell phone 6 approaches the printer 10N. Then, the printer 10M is located inside the Piconet area of the of the cell phone 6, and the cell phone 6 detects the printer 10N and obtains the BD address of the printer 10N. If Hanako does not go toward the printer 10N, and the printer 10N has not been detected for more than the predetermined period T2, the cell phone 6 does not transmit the print instruction, and the procedure shown in FIG. 26 is terminated.

Further, the cell phone 6 selects communication information to be referred to when the print instruction is transmitted to the document server, based on the preliminarily stored priority (S1440-S1460 of FIG. 26).

It is assumed that, Hanako is now at the printer 10N which is closest to the document server 100M, and the document server 100M and the cell phone 6 of Hanako can communicate, according to the Bluetooth communication, with each other. Thus, the cell phone 6 selects, as the communication information, the Bluetooth, which has the highest priority and is used as the communication information to be referred to when the print instruction is transmitted.

Then, the cell phone 6 transmits the print instruction including the BD address of the detected printer 10N to the document server in accordance with the Bluetooth communication method (see S1470 of FIG. 26).

When the document server 100M receives the print instruction in accordance with the Bluetooth communication method from the cell phone 6 (see S1160 and S170 of FIG. 23), based on the e-mail address of the sender of the e-mail message, and the recipient database 1032, it is judged that the print instruction comes from the cell phone 6 owned by Hanako.

Then, the document server 100M reads out the IP address of the printer 10M based on the BD address of the printer 10M included in the received print instruction and the printer database 1030, and using the IP address as the destination, the document server 100M transmits the facsimile data for Hanako to the IP address through the LAN 2. With this procedure, the printer 10N located close to Hanako outputs the image represented by the facsimile data (S1180 of FIG. 23).

If the time period T1 from the transmission of the receipt notification to the print instruction exceeds the predetermined period T1, control proceeds to S1130, where the facsimile data addressed to Hanako is transmitted to the default printer 60 through the LAN so that the image represented by the facsimile data is printed. Then, the document server 100M delete the facsimile data (S1190 of FIG. 23).

According to the data management system described above, the printout for a recipient can be output by the printer close to the recipient without fail. Further, the recipient is only to go to a closely located printer after receiving the receipt notification and check an message indicate on a display, and is not required to input password or the like.

Regarding the received data which does not include the recipient information, it is transmitted to the default printer, and thus, all the data can be printed appropriately. Further, regarding the received data for which the print instruction is not received from the cell phone, it is also transmitted to the default printer and printed out thereby. Thus, all the data is printed out without fail, and no data will be remained in the document server un-printed.

Searching for the printer 10M by the cell phone 6 is performed only when it is necessary. Therefore, power consumption of the cell phone 6 is reduced. Further, the cell phone 6 is configured to perform normal notification (i.e., vibration and/or ringing) and further an notification by displaying messages. With this configuration, existence of the received data can be notified to the holder of the cell phone 6 effectively, without fail.

Further, it is unnecessary to provide an additional function to the printers 10M, and general use printers employing the Bluetooth communication method as a communication method.

It should be noted that the data management system according to the fourth embodiment can be modified in various ways.

According to the fourth embodiment, the document server 100M obtains the IP address of the printer 10N to which the received data is transmitted, based on the BD address included in the print instruction transmitted form the cell phone 6, and the printer database 30 of the document server 100M. However, the invention is not limited to such a configuration. For example, the cell phone 6 may obtain the communication information of the printer 10N stored in the printer 10N making use of a well-known simple network management protocol (SNMP).

Specifically, the printer 10M may store the name of the printer 10M itself, and intrinsic data such as the IP address and BD address, as the management information in the management information base according to the SNMP. With this configuration, the cell phone 6 obtains the intrinsic data from the printer 10M using the SNMP manager, and transmits the printing instruction including the intrinsic data to the document server 100M. Then, the document server 100M can receive the IP address of the printer 10N, to which the received data is transmitted, directly from the cell phone 6, and accordingly it becomes unnecessary to refer to the printer database 1030. Further, a general use printer provided with the MIB can be used as it is.

It should be noted that the data in the MIB can be retrieved using protocol except for the SNMP. For example, if a URL regarding the intrinsic data in the MIB is defined in the printer 10N, the cell phone 6 makes the printer 10N send back the intrinsic data in the MIB, by transmitting a Get command designating the URL using the HTTP.

Further, according to the data management system, the cell phone 6 immediately send the print instruction to the document server 100M, upon detection of the printer 10N. This procedure may be modified in various ways. For example, the cell phone 6 may ask the holder of the cell phone 6 whether the print job is to be performed. With such a configuration, the printout may not be output when the recipient does not intend to have the same. This configuration is effective in particular to a case where the confidential image is printed out. Optionally, a reply to the above-described inquiry may be done with a simple operation (e.g., an operation of one key).

In the fourth embodiment, when the printer 10N is searched for, the cell phone 6 employs the Bluetooth method as the communication method for the wireless LAN. Of course, any other communication method (e.g., IEEE802.11) may be employed alternatively or optionally.

The document server 100M may be integrally provided with the printer 10N. For example, the document server 100M may be an MFP (Multi-Function Peripheral) which has functions of a printer, a facsimile device and the like.

In the fourth embodiment, as the image forming device, the printer 10N is used which prints out images represented by the printing data and/or facsimile data on a recording sheet. The invention is not limited to such a system, and for a device which displays the images represented by the received data, the present invention is applicable.

Further, in the fourth embodiment, after the received data reaches the document server, and after the BD address of the printer 10N is received from the cell phone 6, the document server 100M transmits the received data to the printer 10N. The invention is not limited to such a configuration, and can be modified, for example, as follows.

Among the BD addresses of the printers 10N received from the cell phone 6, the latest BD address is stored, and the document server 100M may transmits the received data to the printer having the stored BD address every time the document server 100M receives the received data.

The present disclosure relates to the subject matters contained in Japanese Patent Applications No. P2001-344757, filed on Nov. 9, 2001, No. P2001-350286, filed on Nov. 15, 2001, No. P2001-372848, filed on Dec. 6, 2001, which are expressly incorporated herein by reference in their entireties.

What is claimed is:

1. A data management system, in which a plurality of printers, a document server and a database server having a database are connected to communicate with one another through a network, the data management system managing image data stored in the database, the image data stored in the database being processed by the printers, wherein the database server comprises:
a data registration system that receives image data and recipient information representing a recipient who receives the image represented by the image data from an external device connected to the network and registers the image data with the database in relationship to the recipient information; and
a recipient information notifying system that notifies the plurality of printers of the recipient information registered with the database in relationship to the image data when the data registration system registers the received image data with the database in relationship to the received recipient information;

wherein each of the plurality of printers comprises:
a recipient information receiving system that receives the notification of the recipient information from the recipient information notifying system in the database server;
a judging system that judges as to whether the printer is capable of establishing wireless communication with a wireless external device, which is assigned with a user ID corresponding to the recipient information;
a notifier system that, when judgment is made that the printer is capable of establishing wireless communication with the wireless external device, notifies the wireless external device of presence of the image data in relationship with the user ID assigned to the wireless external device registered with the database;
a user ID obtaining system that obtains the user ID of the wireless external device, which is judged to be capable of establishing wireless communication with the printer, via the wireless communication;
an image data requesting system that transmits the user ID obtained by the user ID obtaining system and a request for the image data, to the database server when an image forming request is received from the wireless external device that is judged to be capable of establishing wireless communication with the printer, the image forming request including instructions to the printer to form the image and the user ID being registered with the database of the database server in relationship to the recipient information corresponding to the user ID;

wherein the database server further comprises:
a data transmission system that obtains the image data requested by the image data requesting system of the printer from the database and transmits the image data to the printer which transmitted the request for the image data in response to the image data request from the image data requesting system of the printer; and wherein each of the plurality of printers further comprises:
an image data receiver system that receives the image data transmitted from the data transmission system of the database server; and
a printing system that prints the image according to the image data, which was requested by the image data requesting system of the printer and received in the image data receiver system, wherein the document server is configured to select a communication method that transmits a receipt notification to the wireless external device based on a priority stored in a communication method database and a communication information stored in a recipient database.

2. The data management system according to claim 1, wherein each of the plurality of printers further comprises a list obtaining system that obtains a list of image data registered with the database of the database server in relationship to the recipient information corresponding to the user IDs obtained by the user ID obtaining system from the database; and
the notifier system transmits the list obtained by the list obtaining system to the wireless external device in a format displayable in the wireless external device.

3. The data management system according to claim 2, wherein the image forming request from the wireless external device received in the image data requesting system is a request to form an image according to the image data selected by the wireless external device amongst the image data included in the list of image data.

4. A database server having a document server and a database to store image data and capable of communicating with a plurality of printers via a network, the image data being processed by the printers, comprising:

a data registration system that receives, from an external device connected to the network, image data and recipient information representing a recipient who receives the image represented by the image data and registers the received image data with the database in relationship to the received recipient information; and a recipient information notifying system that notifies the plurality of printers of the recipient information registered with the database in relationship to the image data when the data registration system registers the received image data with the database in relationship to the received recipient information; and a data transmitting system that searches the database to detect the image data registered in relationship to the recipient information corresponding to a user ID, which is assigned to an external wireless device, when a request for the image data, from one of the printers receiving the user ID from the external wireless device through the network, is received along with the user ID and transmits the detected image data to the one of the printers requesting for the image data, wherein the document server is configured to select a communication method that transmits a receipt notification to the wireless external device based on a priority stored in a communication method database and a communication information stored in a recipient database.

5. The database server according to claim 4, wherein the database includes a list of the image data registered with the database in relationship to the recipient information corresponding to the user IDs transmitted along with the request for the image data; and wherein the data transmitting system receives a request for sending the list of the image data from the one of the plurality of printers, which received the user ID from the external wireless device through the network, and transmits the list of image data registered with the database in relationship to the recipient information corresponding to the user ID to the one of the plurality of printers.

* * * * *